United States Patent
Kaya

(10) Patent No.: US 12,393,105 B2
(45) Date of Patent: Aug. 19, 2025

(54) PRINTER AND DIGITAL CAMERA WITH PRINTER

(71) Applicant: FUJIFILM Corporation, Tokyo (JP)

(72) Inventor: Akimasa Kaya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 128 days.

(21) Appl. No.: 18/308,540

(22) Filed: Apr. 27, 2023

(65) Prior Publication Data
US 2023/0259008 A1 Aug. 17, 2023

Related U.S. Application Data

(63) Continuation of application No. PCT/JP2021/039299, filed on Oct. 25, 2021.

(30) Foreign Application Priority Data

Oct. 28, 2020 (JP) .................................. 2020-180732

(51) Int. Cl.
- *G03B 17/53* (2021.01)
- *G03B 27/00* (2006.01)
- *G03C 3/00* (2006.01)
- *H04N 1/00* (2006.01)

(52) U.S. Cl.
CPC ............. *G03B 17/53* (2013.01); *G03B 27/00* (2013.01); *G03C 3/00* (2013.01); *H04N 1/00188* (2013.01); *H04N 1/00251* (2013.01); *H04N 2201/0063* (2013.01); *H04N 2201/0084* (2013.01)

(58) Field of Classification Search
None
See application file for complete search history.

(56) References Cited

U.S. PATENT DOCUMENTS

| | | | |
|---|---|---|---|
| 6,195,508 B1* | 2/2001 | Katayama | G03B 17/32 396/34 |
| 11,520,215 B2* | 12/2022 | Kaya | G03B 17/34 |
| 2003/0165338 A1 | 9/2003 | Mizuno et al. | |
| 2005/0281553 A1* | 12/2005 | Takatori | G03C 3/00 396/518 |
| 2018/0231873 A1* | 8/2018 | Nakai | G03B 17/26 |
| 2018/0231874 A1* | 8/2018 | Nakai | G03D 9/00 |
| 2018/0231893 A1 | 8/2018 | Sugiyama | |
| 2018/0335690 A1 | 11/2018 | Fujii | |
| 2019/0084317 A1 | 3/2019 | Fuji et al. | |

(Continued)

FOREIGN PATENT DOCUMENTS

| | | |
|---|---|---|
| EP | 3 936 939 A1 | 1/2022 |
| JP | 2002-006411 A | 1/2002 |

(Continued)

OTHER PUBLICATIONS

International Search Report issued in PCT/JP2021/039299; mailed Jan. 11, 2022.

(Continued)

*Primary Examiner* — Rodney E Fuller
(74) *Attorney, Agent, or Firm* — Studebaker Brackett PLLC

(57) ABSTRACT

A printer unit has a film pack room into which any one of a first instant film pack or a second instant film pack is loaded, an exposure head, and a controller. The second instant film pack is aligned in the film pack room so as to be shifted to the one side.

6 Claims, 29 Drawing Sheets

(56) References Cited

U.S. PATENT DOCUMENTS

2019/0361336 A1* 11/2019 Nakai ................... G03B 17/50
2023/0024154 A1    1/2023 Kaya

FOREIGN PATENT DOCUMENTS

| JP | 2004-246021 A | 9/2004 |
|----|---------------|--------|
| JP | 3827217 B2 | 9/2006 |
| WO | 2017/145481 A1 | 8/2017 |
| WO | 2021/200688 A1 | 10/2021 |

OTHER PUBLICATIONS

International Preliminary Report on Patentability (Chapter I) and Written Opinion of the International Searching Authority issued in PCT/JP2021/039299; issued May 2, 2023.

The extended European search report issued by the European Patent Office on Mar. 25, 2024, which corresponds to European Patent Application No. 21886146.6.

"Notice of Reasons for Refusal" Office Action issued in JP 2022-559124; mailed by the Japanese Patent Office on May 27, 2025.

\* cited by examiner

PRINTER AND DIGITAL CAMERA WITH PRINTER

CROSS-REFERENCE TO RELATED APPLICATIONS

This application is a Continuation of PCT International Application No. PCT/JP2021/039299 filed on 25 Oct. 2021, which claims priority under 35 U.S.C. § 119(a) to Japanese Patent Application No. 2020-180732 filed on 28 Oct. 2020. The above application is hereby expressly incorporated by reference, in its entirety, into the present application.

BACKGROUND OF THE INVENTION

1. Field of the Invention

The present invention relates to a printer and a digital camera with a printer.

2. Description of the Related Art

Various mobile printers or digital cameras with a printer for recording images captured by a digital camera or a smartphone on a recording medium such as an instant film have been on sale.

In general, a printer or a digital camera with a printer that uses an instant film as a recording medium has a configuration including a loading room and an exposure head. An instant film pack that accommodates a plurality of instant films in a case is loaded into the loading room. The exposure head exposes an image on the instant film accommodated in or discharged from the case.

There are instant films having a variety of sizes, and printers or digital cameras with a printer that selectively use instant films having different sizes have been known. An instant film exposure apparatus described in JP3827217B is applied to the printer, the digital camera with a printer, or an analog-type instant camera, and has a loading room capable of accommodating instant film packs having large and small sizes. The loading room is formed in a size for accommodating the larger instant film pack, and is configured to accommodate the smaller instant film pack in a space on a left side of a partition plate. The partition plate for positioning the smaller instant film pack is movable, and in a case where the larger instant film pack is inserted into the loading room, the partition plate is pressed to the case of the instant film pack and retreated from the loading room.

Meanwhile, in the instant film exposure apparatus described in JP3827217B, a claw member that discharges the instant film from an inside of the instant film pack is provided. Two claw members are provided at different positions in the loading room in accordance with positions of the instant film packs having large and small sizes loaded in the loading room.

SUMMARY OF THE INVENTION

However, in the instant film exposure apparatus described in JP3827217B, two claw members are provided, and furthermore a complicated mechanism is required that drives only one claw member among the two claw members in accordance with the instant film pack loaded in the loading room. Therefore, the number of components increases, and costs of the printer and the digital camera with a printer also increase.

The present invention has been made to solve the above-mentioned problems, and an object of the present invention is to provide a printer and a digital camera with a printer capable of accommodating two types of instant film packs and preventing the increase in the number of components at a low cost.

In order to solve the above-mentioned problems, a printer according to an aspect of the present invention includes a loading room, an exposure head, a transport mechanism, a discharge mechanism, and a position alignment unit. First and second cases have insertion ports into which the claw member is inserted. A second instant film pack has a dimension smaller than a dimension of a first instant film pack in a width direction. The position alignment unit aligns the second instant film pack so as to be shifted to one side in the width direction on which claw member is positioned. The first and second instant film packs aligned by the position alignment unit have the insertion ports arranged at the same position in the loading room. The loading room is loaded with any one of the first instant film pack or the second instant film pack, the first instant film pack including at least a plurality of first instant films and the first case which accommodates the first instant films in a stacking manner and in which a discharge port for discharging the first instant film is formed, the second instant film pack including at least a plurality of second instant films and the second case which accommodates the second instant films in a stacking manner and in which a discharge port for discharging the second instant film is formed. The exposure head exposes an image on the first instant film or the second instant film. The transport mechanism transports the first instant film or the second instant film to an exposure position at which the exposure head exposes the image. The discharge mechanism has a claw member that is positioned on one side in a width direction of the loading room and that enters inside the first case or the second case, and in which the claw member presses and discharges the first or second instant film through the discharge port. The position alignment unit aligns the first and second instant film packs in the loading room.

It is preferable that the second instant film pack has a stepped portion having a dimension larger than a dimension of the first instant film pack in a thickness direction parallel to a loading direction into the loading room and orthogonal to the width direction, and the position alignment unit includes a first position alignment unit that aligns the first instant film pack by touching both side surfaces of the first instant film pack, and a second position alignment unit that aligns the second instant film pack so as to be shifted to the one side in the width direction on which the claw member is positioned in the loading room by being fitted to the stepped portion.

It is preferable that the stepped portion is a rib that extends in parallel with a length direction orthogonal to the width direction and the thickness direction, and protrudes in the thickness direction, and the second position alignment unit is a position alignment groove that is fitted to the rib.

It is preferable that the first position alignment unit is a wedge-shaped position alignment protrusion provided on the side surface of the loading room. It is preferable that the second position alignment unit is positioned inside the loading room in the width direction with respect to the first position alignment unit.

A digital camera with a printer according to an aspect of the present invention includes the printer and an imaging unit that includes an imaging optical system, and captures a subject image to output image data to the above printer.

According to the present invention, it is possible to accommodate two types of instant film packs and prevent an increase in the number of components.

DESCRIPTION OF THE PREFERRED EMBODIMENTS

[Overview of Digital Camera with Printer]

Figure 1:
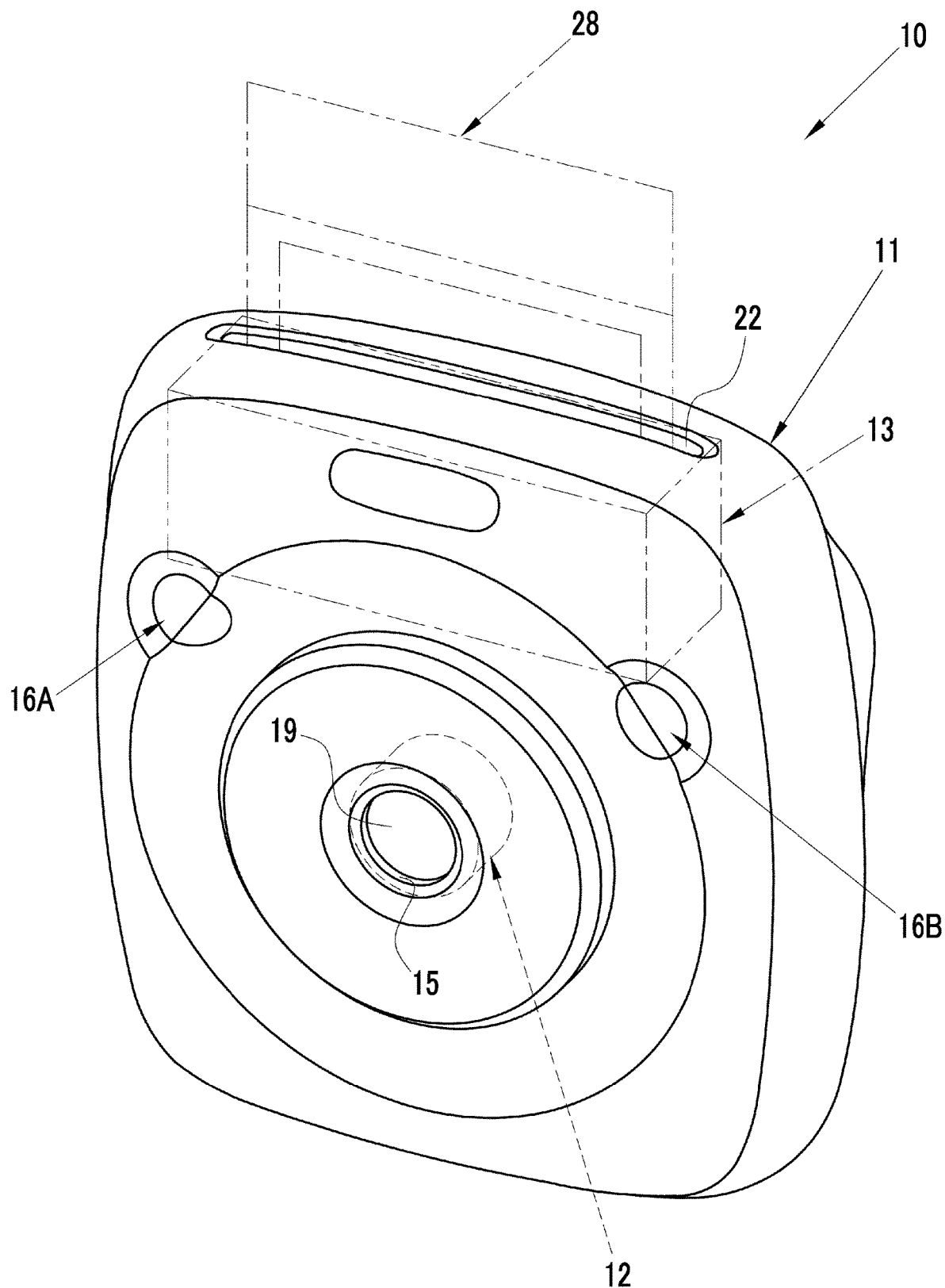
FIG. 1 is a front perspective view of a digital camera with a printer.

In FIG. 1, a digital camera 10 with a printer according to an embodiment of the present invention includes a camera body 11, an imaging unit 12, and a printer unit 13. An imaging window 15 and two release switches 16A and 16B are provided on a front surface of the camera body 11.

The camera body 11 has a substantially square shape viewed from a front surface. The digital camera 10 with a printer selectively uses any one of two types of instant films 28 and 29 (see FIGS. 9 and 13). A first instant film 28 is a square type instant film, and a second instant film 29 is a card type instant film. As will be described later, the second instant film 29 has a dimension in a width direction X smaller than a dimension of the first instant film 28, and has the same dimension in a transport direction.

The imaging window 15 is disposed in a center on the front surface of the camera body 11. The imaging window 15 exposes an imaging optical system 19 (see FIG. 2) constituting the imaging unit 12.

Figure 2:
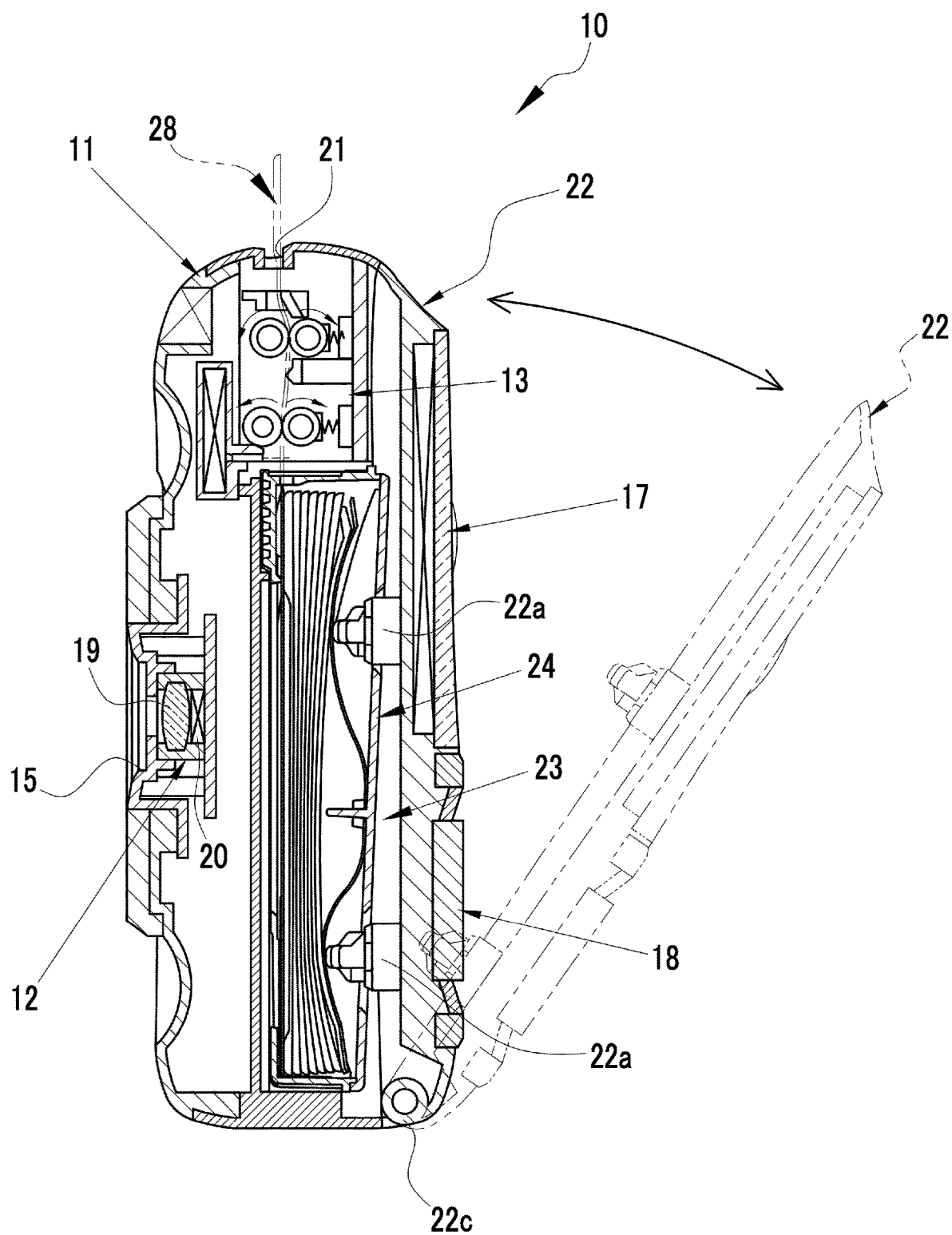
FIG. 2 is a longitudinal cross-sectional view of a center of the digital camera with a printer.

As shown in FIG. 2, the imaging optical system 19 and a solid-state imaging element 20 are provided in the imaging unit 12. For example, the solid-state imaging element 20 is a complementary metal-oxide-semiconductor (CMOS) image sensor, and includes a light receiving surface constituted by a plurality of pixels (not shown) arranged in a two-dimensional matrix shape. Each pixel includes a photoelectric conversion element, photoelectrically converts a subject image formed on the light receiving surface by the imaging optical system 19, and generates an imaging signal.

The solid-state imaging element 20 includes signal processing circuits (all not shown) such as a noise removal circuit, an auto gain controller, and an A/D conversion circuit. The noise removal circuit performs a noise removal process on the imaging signal. The auto gain controller amplifies a level of the imaging signal to an optimum value. The A/D conversion circuit converts the imaging signal into a digital signal, and outputs the digital signal to a built-in memory (not shown) from the solid-state imaging element 20. An output signal of the solid-state imaging element 20 is image data (so-called RAW data) having one color signal for each pixel.

The solid-state imaging element 20 is driven by pressing at least one of the release switch 16A or 16B, and the subject image is captured.

A film ejection port 21 is provided in a top surface of the camera body 11. The first instant film 28 on which an image has been printed is ejected from the film ejection port 21.

Figure 3:
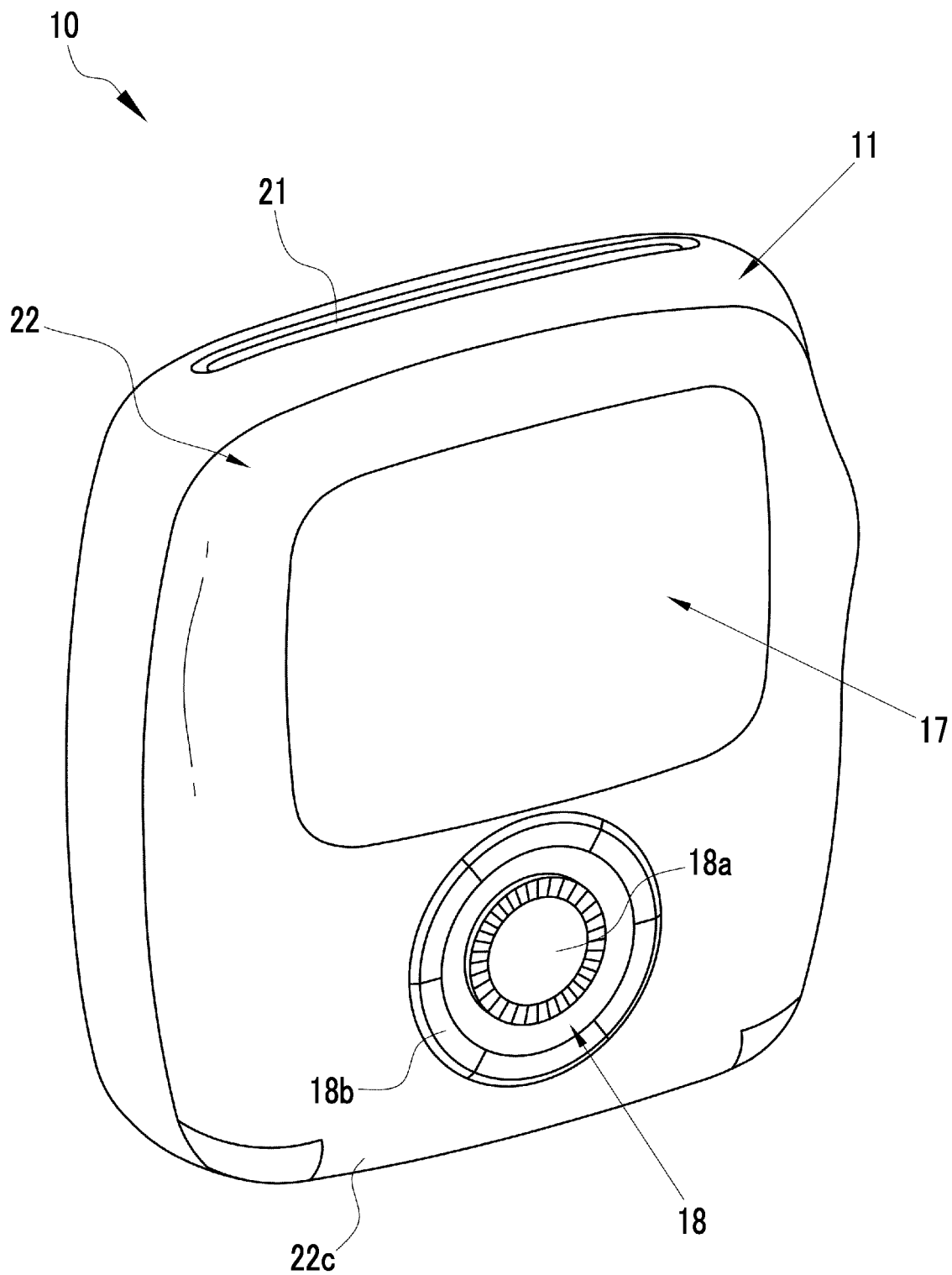
FIG. 3 is a rear perspective view of the digital camera with a printer with a loading cover in a closed position.

As shown in FIG. 3, a loading cover 22 is attached to a rear surface side of the camera body 11 through a hinge portion 22c. The hinge portion 22c rotatably supports the loading cover 22 between an opened position (state shown in FIG. 4) and a closed position (state shown in FIG. 3). The loading cover 22 opens a film pack room 23 within the camera body 11 in the opened position. The loading cover 22 covers the film pack room 23 in the closed position. A locking mechanism and an unlocking mechanism (all not shown) are provided between the camera body 11 and the loading cover 22, and in a case where the locking mechanism holds the loading cover 22 in the closed position and operates the unlocking mechanism, the loading cover 22 moves rotationally from the closed position to the opened position.

Figure 4:
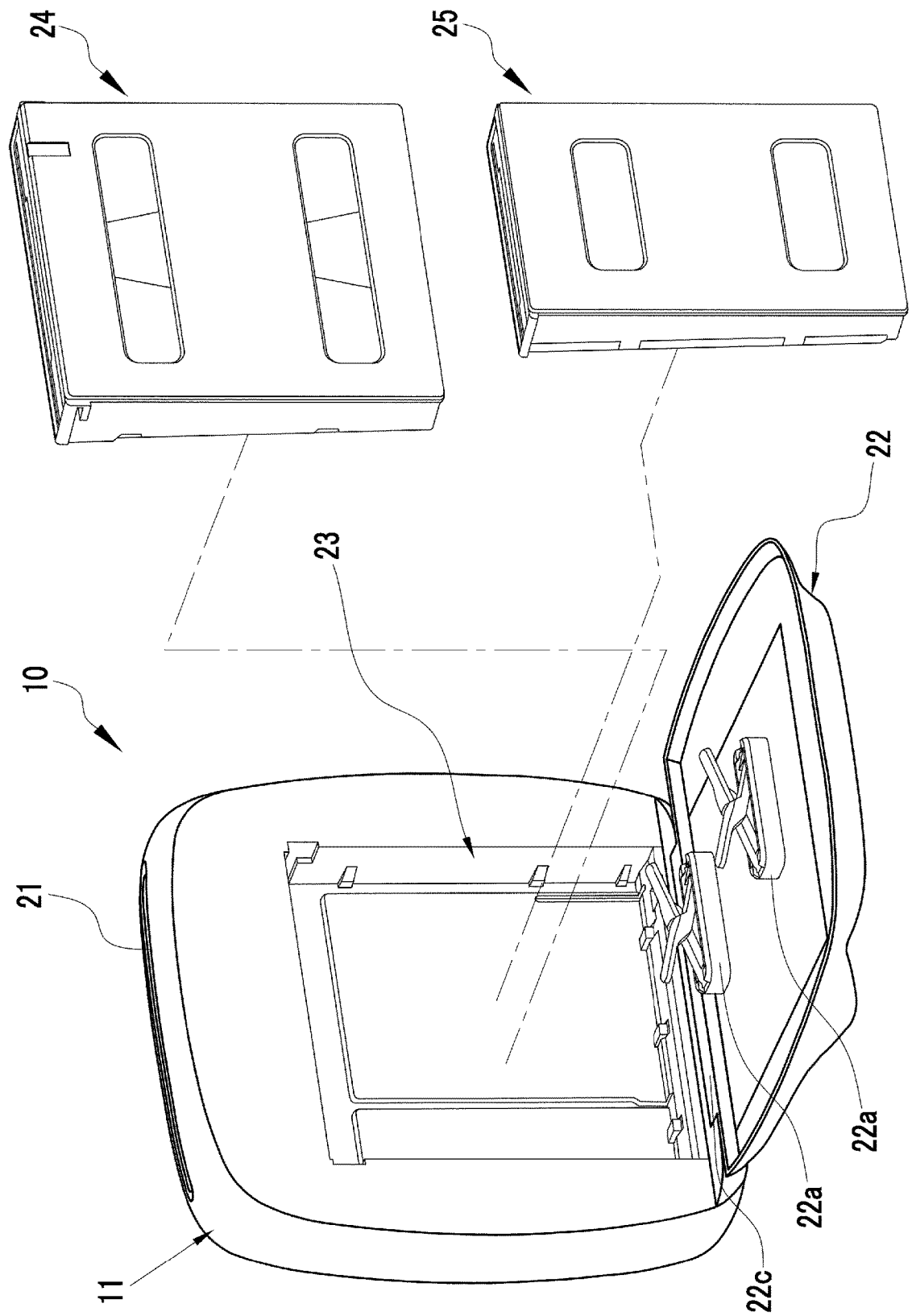
FIG. 4 is a rear perspective view of the digital camera with a printer with the loading cover in an opened position.

As shown in FIG. 4, any one of a first instant film pack 24 that accommodates the first instant film 28 or a second instant film pack 25 that accommodates the second instant film 29 is loaded into the film pack room 23 (loading room). The user selects one of the first and second instant film packs 24 and 25 that accommodate the first and second instant films 28 and 29 that the user wants to use and loads the selected film pack into the film pack room 23. A pair of film holding portions 22*a* are provided on an inner surface of the loading cover 22. A detection switch 78 (see FIGS. 17 and 27) is provided in the film pack room 23.

A rear display unit 17 and an operation unit 18 are provided on an outer surface of the loading cover 22, that is, a rear surface of the camera body 11. The rear display unit 17 is, for example, a liquid crystal display (LCD) panel. Image data items for one frame output from the solid-state imaging element 20 are sequentially input into the rear display unit 17, and are displayed as a live preview image.

A photographer presses at least one of the release switch 16A or 16B, and thus, capturing is started. Image data items are acquired from the solid-state imaging element 20 through the capturing. An image processing unit (not shown) performs known image processing on the image data items, and then the image data items are compressed. Examples of the image processing include matrix operation, demosaicing, γ correction, luminance conversion, color difference conversion, and resizing. The image data items on which the image processing and the compression are performed are recorded in a built-in memory (not shown) such as a flash memory provided within the camera body 11.

In a case where a menu switch 18*a* of the operation unit 18 is pressed, the image is played and displayed on the rear display unit 17 based on the image data items recorded in the built-in memory. In a case where an image desired to be printed is displayed on the rear display unit 17, the photographer presses a print switch 18*b* of the operation unit 18, and thus, a printing process by the printer unit 13 is started.

[Configuration of Instant Film Pack]

Figure 5:
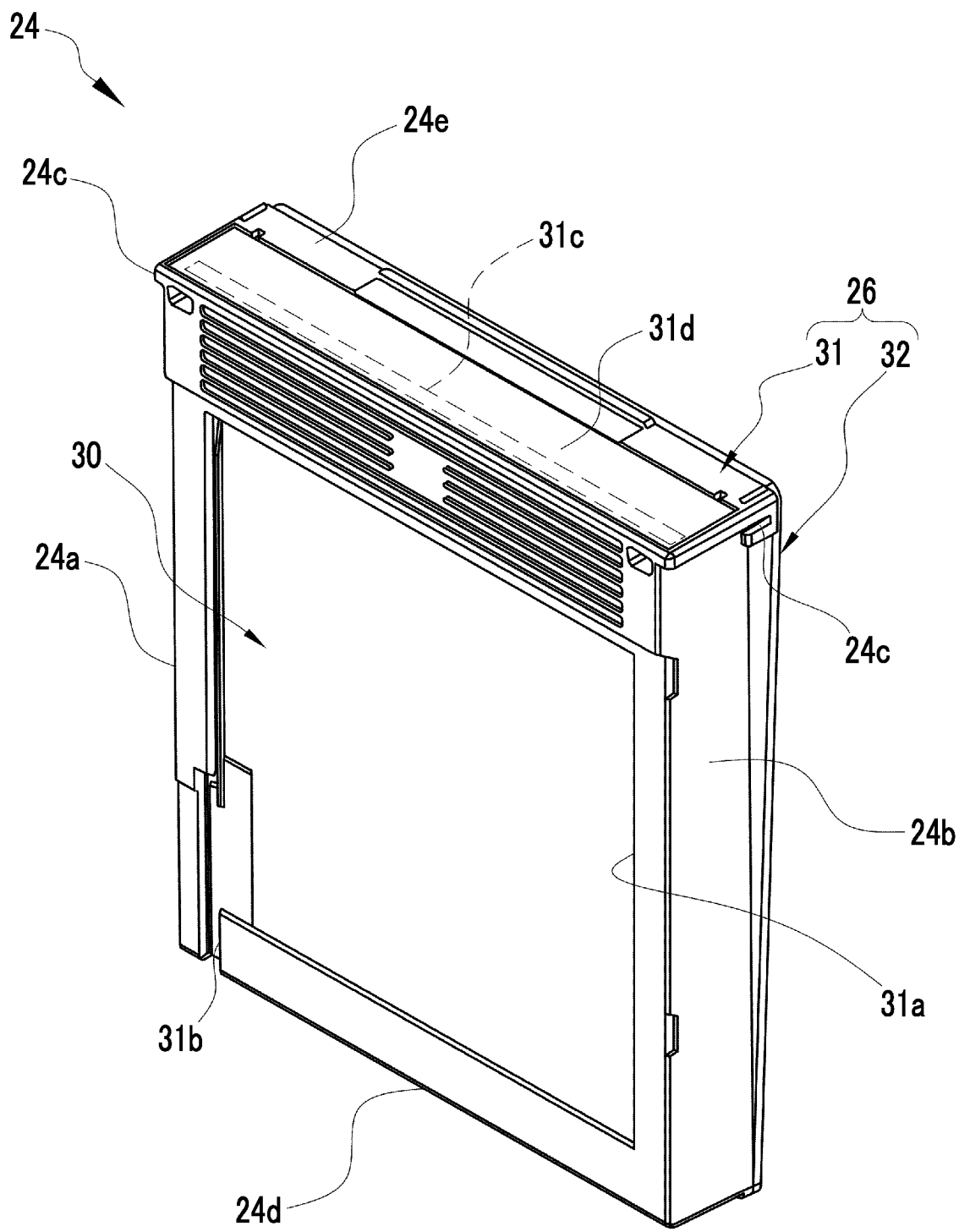
FIG. 5 is a perspective view of a first instant film pack.
Figure 6:
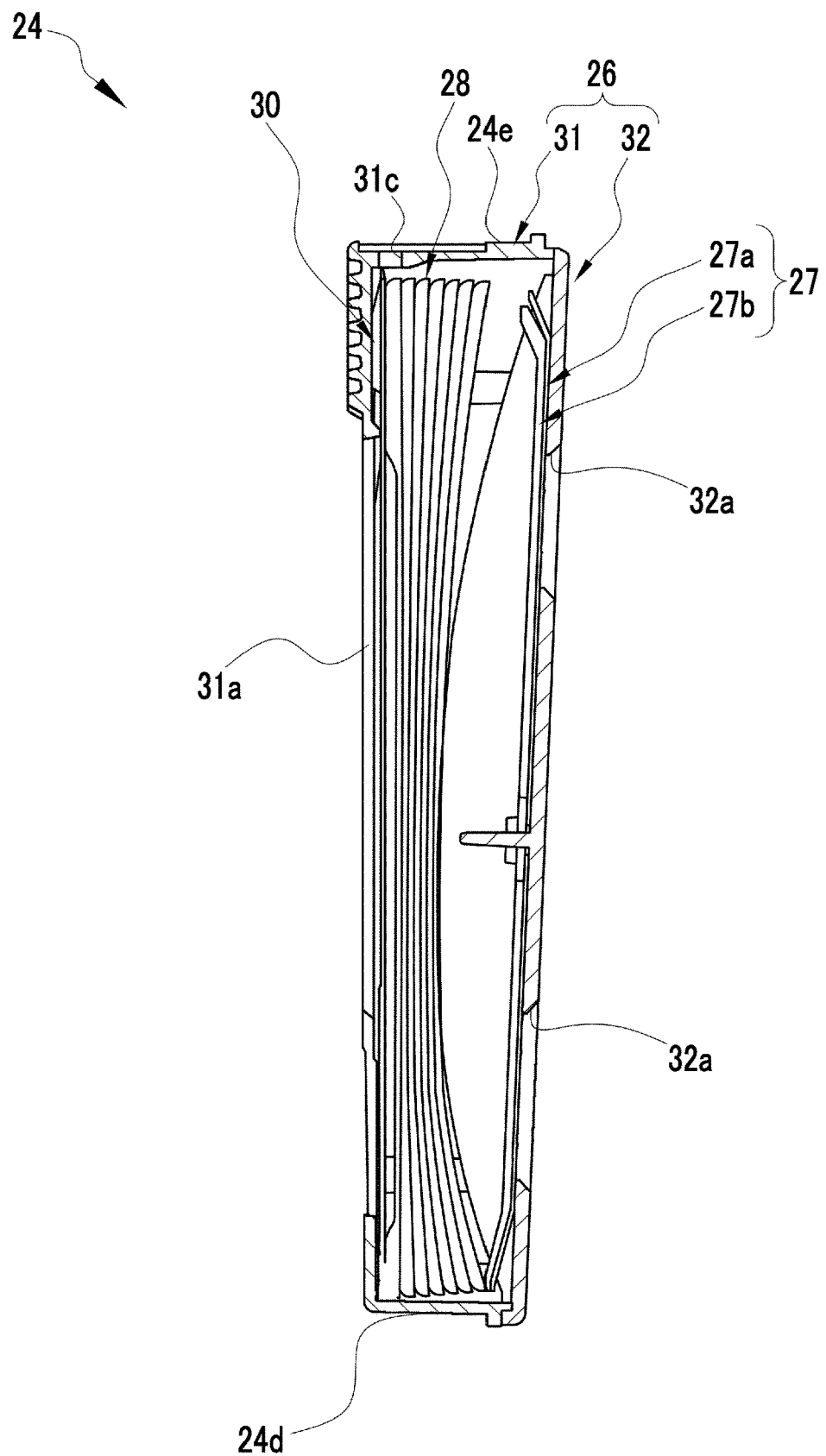
FIG. 6 is a cross-sectional view of the first instant film pack.

As shown in FIGS. 5 and 6, the first instant film pack 24 includes a case 26, a film press plate 27, a plurality of first instant films 28, and a film cover 30.

As shown in FIG. 6, the case 26 accommodates the plurality of first instant films 28 and one film cover 30 in a stacking manner. The case 26 is made of a material such as a thermoplastic resin or a paper resin acquired by mixing the thermoplastic resin with cellulose. The case 26 is configured of a box-shaped case member 31, and a cover 32 that covers an opening formed in a rear surface side of the case member 31.

Figure 7:
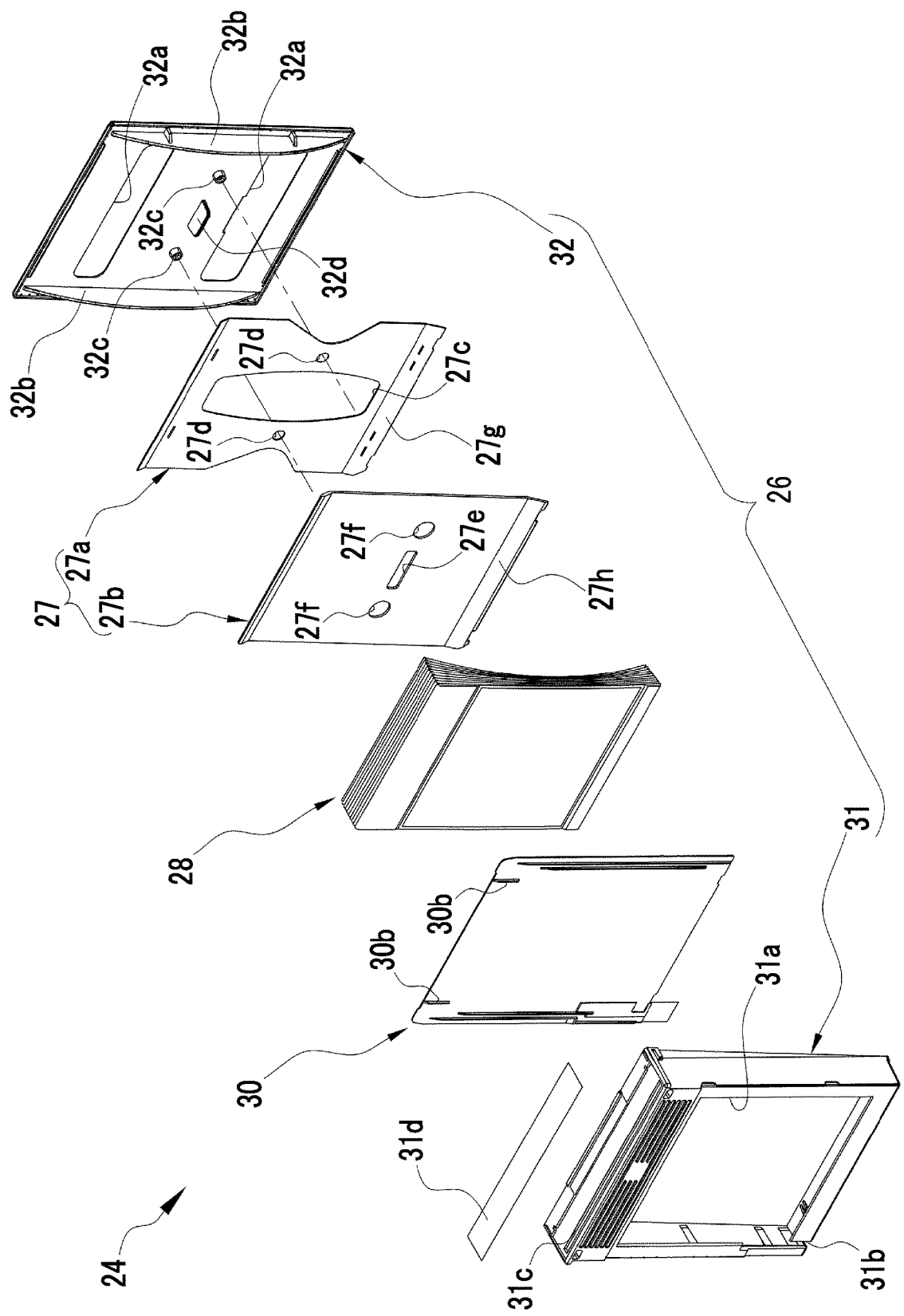
FIG. 7 is an exploded perspective view of the first instant film pack.

As shown in FIG. 7, an exposure opening 31*a* for exposing the first instant film 28 is formed in the case member 31. In the following description, surfaces of the first and second instant film packs 24 and 25 in which the exposure openings 31*a* are formed are "front surfaces", surfaces opposite to the "front surfaces" are "rear surfaces", surfaces facing the film ejection port 21 of the camera body 11 are "top surfaces", and surfaces opposite to the "top surfaces" are "bottom surfaces". The film cover 30 is overlapped before the first instant film 28 in a foremost layer initially set in the exposure opening 31*a* within the case member 31. Accordingly, the exposure opening 31*a* is lighttightly blocked by the film cover 30. A cut-off portion 31*b* into which a known claw member 57 (see FIGS. 14 and 15) formed at the camera is inserted is formed in a lower portion of the exposure opening 31*a*. The cut-off portion 31*b* corresponds to an insertion port in the claims. The insertion port into which the claw member 57 is inserted is not limited to the cut-off portion 31*b*, and may be a through-hole that penetrates the case member 31.

A discharge port 31*c* is formed on a top surface of the case member 31. The discharge port 31*c* is formed in a slit shape. The first instant films 28 or the film cover 30 are discharged one by one outwards from the first instant film pack 24 by the claw member 57 inserted into the cut-off portion 31*b* of the case member 31 through the discharge port 31*c*.

A light shielding seal 31*d* is stuck to the case member 31 so as to close the discharge port 31*c* from the outside. The light shielding seal 31*d* is formed as a flexible sheet. The light shielding seal 31*d* is stuck to only one edge of a long side of the discharge port 31*c* so as not to hinder the first instant film 28 or the film cover 30 when the first instant film or the film cover passes through the discharge port 31*c*.

As shown in FIG. 7, the cover 32 includes a pair of openings 32*a*, a pair of unit support protrusions 32*b*, a pair of caulking pins 32*c*, and a support piece 32*d*. The pair of openings 32*a* are formed so as to be vertically spaced apart from each other by a predetermined interval, and serve as an entrance into which the film holding portions 22*a* provided in the digital camera 10 with a printer are inserted when the digital camera 10 with a printer is loaded.

The pair of unit support protrusions 32*b* are provided at both side edge portions of the cover 32 so as to be vertically long, and each has an arc shape of which a center portion protrudes toward the exposure opening 31*a*. The unit support protrusions 32*b* touch both side edge portions on a rear surface of the first instant film 28 positioned in the last layer, and push up the first instant film 28 by each having the arc shape of which the center portion protrudes toward the exposure opening 31*a*. Accordingly, a gap between the film cover 30 and the exposure opening 31*a* is prevented from being formed.

The pair of caulking pins 32*c* are used for attaching the film press plate 27. The support piece 32*d* supports a center portion of the first instant film 28 positioned in the last layer from behind, and prevents the first instant film 28 from being bent in which the center portion is curved toward the cover 32.

The film press plate 27 is composed of two elastic sheets 27*a* and 27*b* made of a synthetic resin. The sheet 27*a* is pressed by the pair of film holding portions 22*a* when the loading cover 22 is closed, and is curved so as to be convex toward the cover 32. An opening 27*c* and a pair of holes 27*d* are formed in the sheet 27*a*. The opening 27*c* is formed in a center portion of the sheet 27*a* so as to be vertically long, and the support piece 32*d* is inserted into this opening. The pair of caulking pins 32*c* are inserted into the pair of holes 27*d*, and the pair of holes is used for attaching the film press plate 27 to the cover 32.

An opening 27*e* and a pair of holes 27*f* are formed in the sheet 27*b*. The opening 27*e* is formed in a center portion of the sheet 27*a*, and the support piece 32*d* is inserted into this opening. The pair of caulking pins 32*c* are inserted into the pair of holes 27*f*. A lower end portion 27*h* of the sheet 27*b* is attached to a lower end portion 27*g* of the sheet 27*a*. Accordingly, the sheet 27*b* prevents the sheet 27*a* from being slack, and prevents light leak from the pair of openings 32*a*. The sheet 27*b* pushes up the first instant film 28 in a substantially planar manner when the sheet 27*a* is elastically bent by the pair of film holding portions 22*a*. As a result, the film cover 30 positioned in the foremost layer or the first instant film 28 is pressed rearwards on the front surface of the case member 31.

[Configuration of L-Shaped Protrusions]

L-shaped protrusions 24*c* are provided on both side surfaces 24*a* and 24*b* of the first instant film pack 24. The protrusions 24*c* are protrusions provided to prevent the first instant film pack 24 from being reversely loaded.

[Configuration of First Instant Film]

Figure 8:
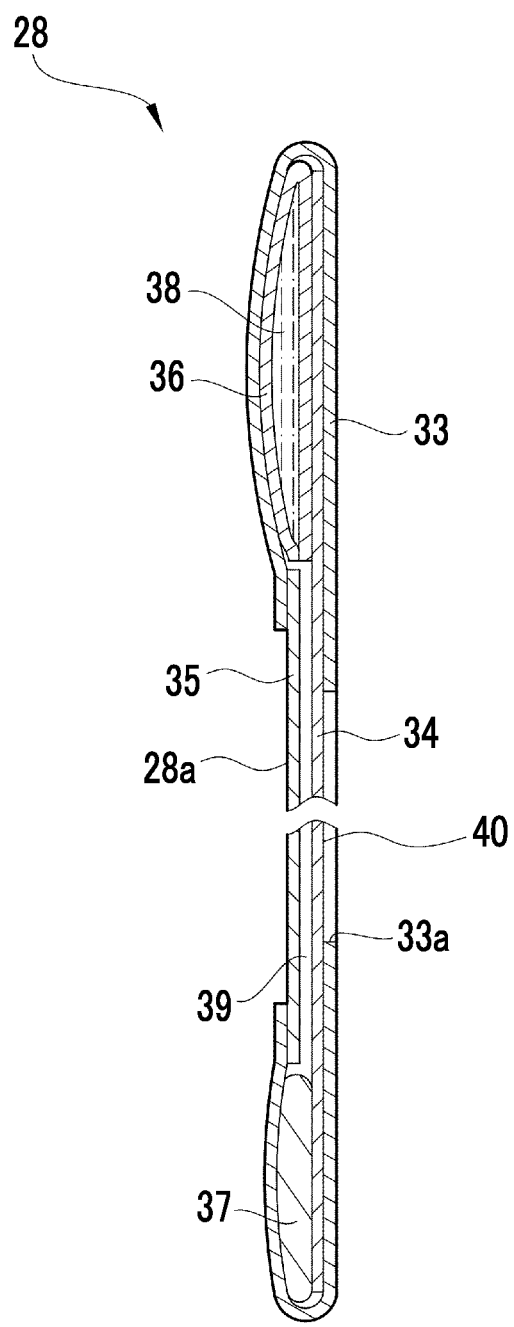
FIG. 8 is a cross-sectional view of a first instant film.

As shown in FIG. 8, the first instant film 28 is configured of a mask sheet 33, a photosensitive sheet 34, a cover sheet 35, a developer pod 36, and a trap portion 37, and is a so-called mono-sheet type film. The mask sheet 33 is formed as a sheet made of a thin synthetic resin, and includes a screen opening 33a. A photosensitive layer, a diffusion reflective layer, an image reception layer, and the like are provided in the photosensitive sheet 34. The cover sheet 35 has an exposure surface 28a facing an exposure head 51 to be described below.

The developer pod 36 is formed in a substantially bag shape, and contains a developer 38 therein. The developer pod 36 is pasted onto an end portion of the photosensitive sheet 34 close to the discharge port 31c, and is wrapped by an end portion of the mask sheet 33. In the width direction X of the first instant film 28, both ends of the developer pod 36 are spaced apart from both ends of the first instant film 28 by a predetermined interval.

Figure 9:
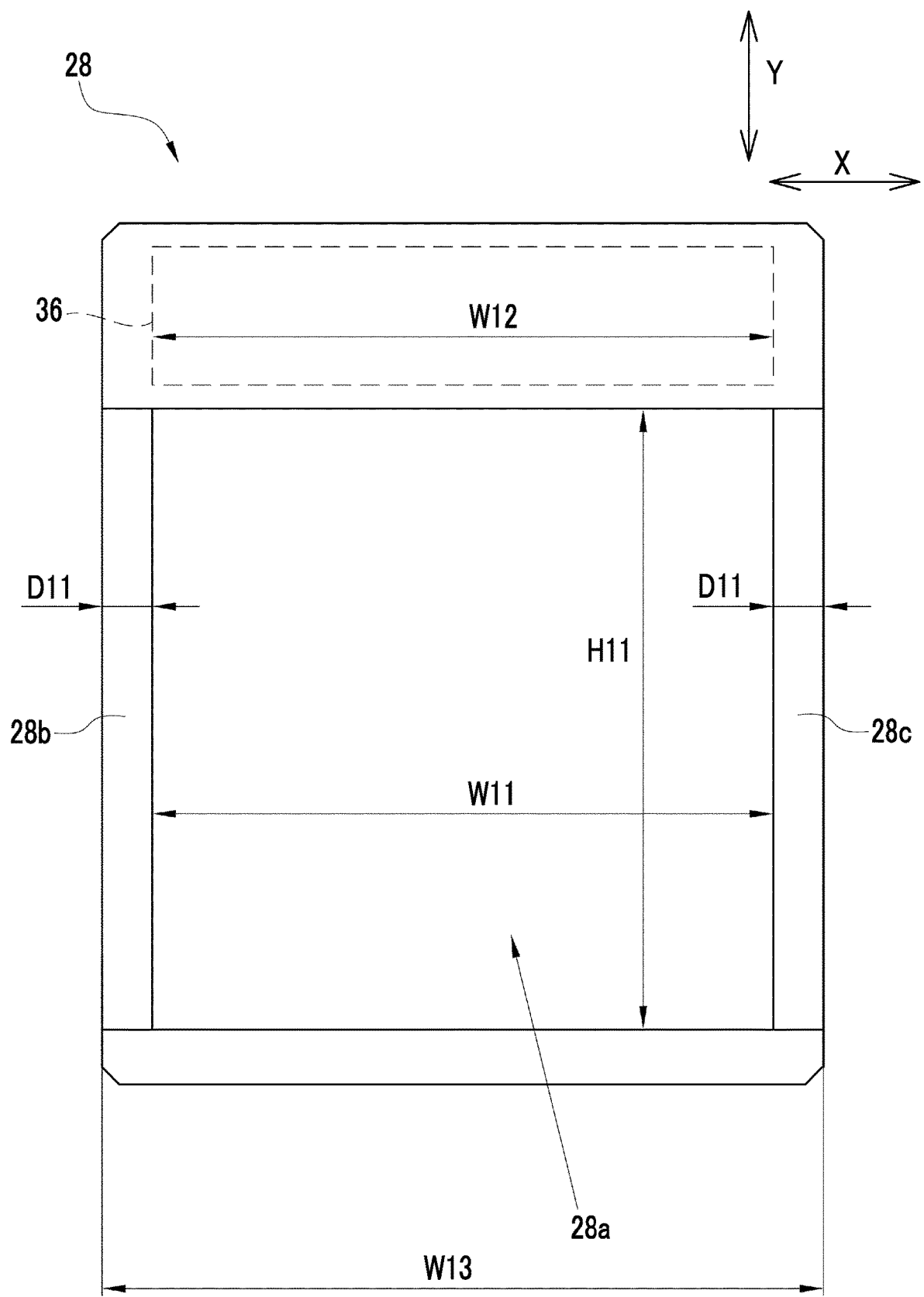
FIG. 9 is a front view of the first instant film.

As shown in FIG. 9, a dimension W12 of the developer pod 36 in the width direction X is equal to a dimension W11 of the exposure surface 28a in the width direction X. A case where the dimensions in the width direction X are equal to each other includes a case where the dimensions in the width direction are substantially equal to each other. Of the first instant film 28, in the width direction X of the exposure surface 28a, portions outside both ends of the exposure surface 28a and the developer pod 36 are side edge portions 28b and 28c. As shown in FIG. 8, the trap portion 37 is stuck on an end portion of the photosensitive sheet 34 opposite to the discharge port 31c, and is similarly wrapped by the end portion of the mask sheet 33. In the case of the example shown in FIG. 9, for example, the dimension W11 of the exposure surface 28a in the width direction X is 62 mm, the dimension H11 in a transport direction Y orthogonal to the width direction X is also 62 mm, and dimensions D11 of the side edge portions 28b and 28c in the width direction X are 5 mm. In this case, a dimension W13 of the first instant film 28 in the width direction X is 72 mm.

As will be described in detail later, the photosensitive layer of the first instant film 28 is irradiated with a print light at the time of printing, and thus, the photosensitive layer is exposed. The developer pod 36 is torn at the time of development, and the developer 38 flows and is spread into a gap 39 between the photosensitive sheet 34 and the cover sheet 35. An image acquired through the exposure of the photosensitive layer is reversed by the diffusion reflective layer, and is transferred to the image reception layer. By doing this, a positive image appears on a positive image observation surface 40 of the photosensitive sheet 34 exposed through the screen opening 33a.

The film cover 30 is formed as a sheet thinner than the first instant film 28, and has light-shielding properties and flexibility. The film cover 30 is a molded item made of a synthetic resin, and is made, for example, of polystyrene containing carbon black. That is, the film cover 30 has rigidity higher than the first instant film 28. In a case where the first instant film pack 24 is loaded into the film pack room 23 and is used, the film cover 30 is ejected to the film ejection port 21 by a spreading roller pair 54 (see FIG. 15) to be described later.

[Configuration of Protrusion for Reversal Loading Prevention and Ribs for Position Alignment]

Figure 10:
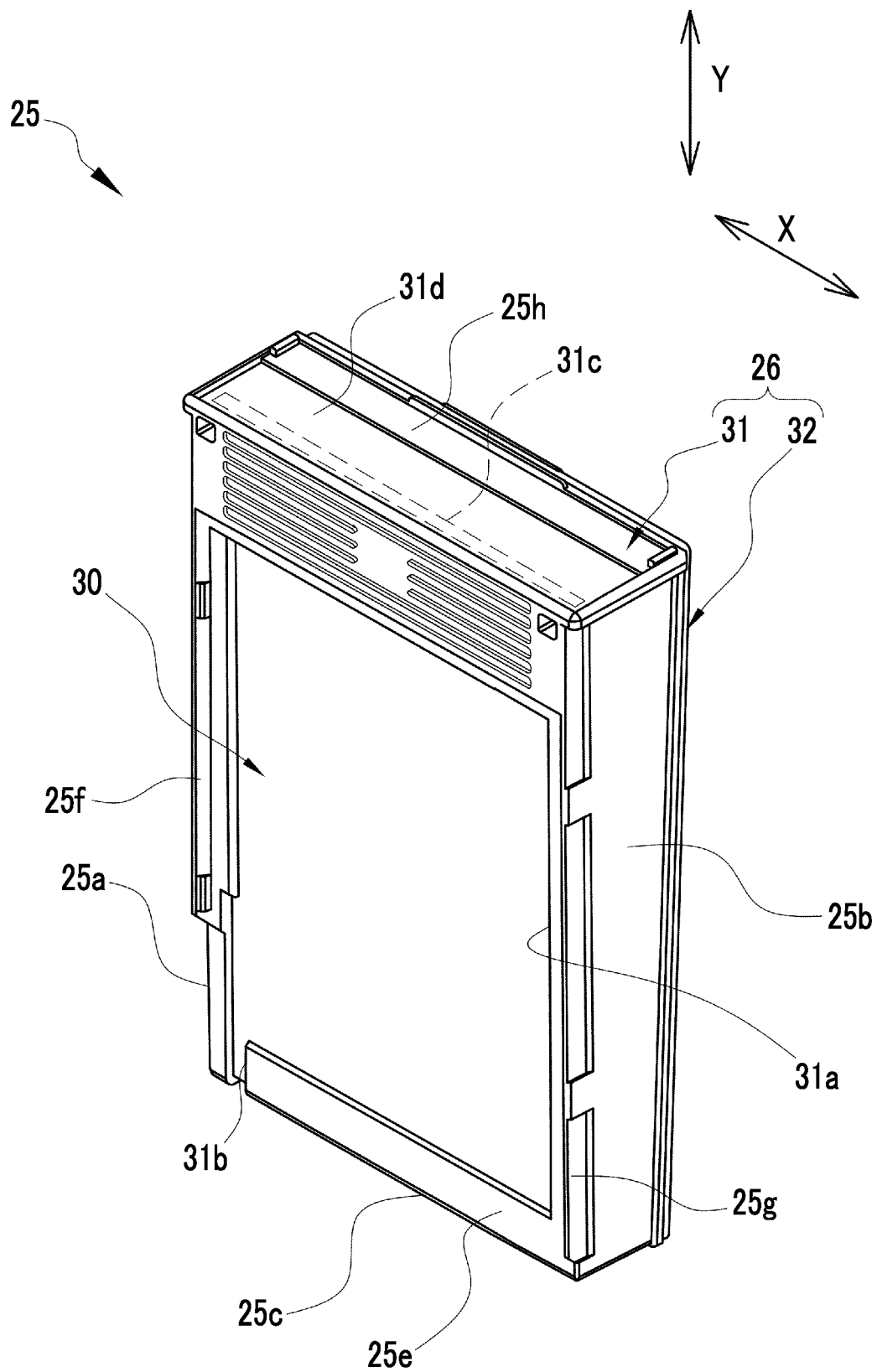
FIG. 10 is a perspective view of a second instant film pack.

As shown in FIG. 10, although the second instant film pack 25 has the same basic configuration as the first instant film pack 24, since the types of the first and second instant films 28 and 29 to be accommodated are different, sizes thereof and locations at which the reversal loading prevention and the position alignment are performed are different. Hereinafter, parts having the same functions as the parts of the first instant film pack 24 are given by the same references and the description thereof will be omitted.

The second instant film pack 25 includes a case 26, a film press plate 27, a plurality of second instant films 29, and a film cover 30. As described above, the case 26, the film press plate 27, and the film cover 30 in the second instant film pack 25 have sizes that match the second instant film 29.

Similar to the first instant film pack 24, the discharge port 31c is formed in a top surface of a case member 31. A light shielding seal 31d is stuck to the case member so as to close the discharge port 31c from the outside. The second instant film 29 or the film cover 30 are discharged one by one outwards from the second instant film pack 25 by the claw member 57 inserted into a cut-off portion 31b of the case member 31 through the discharge port 31c.

Figure 11:
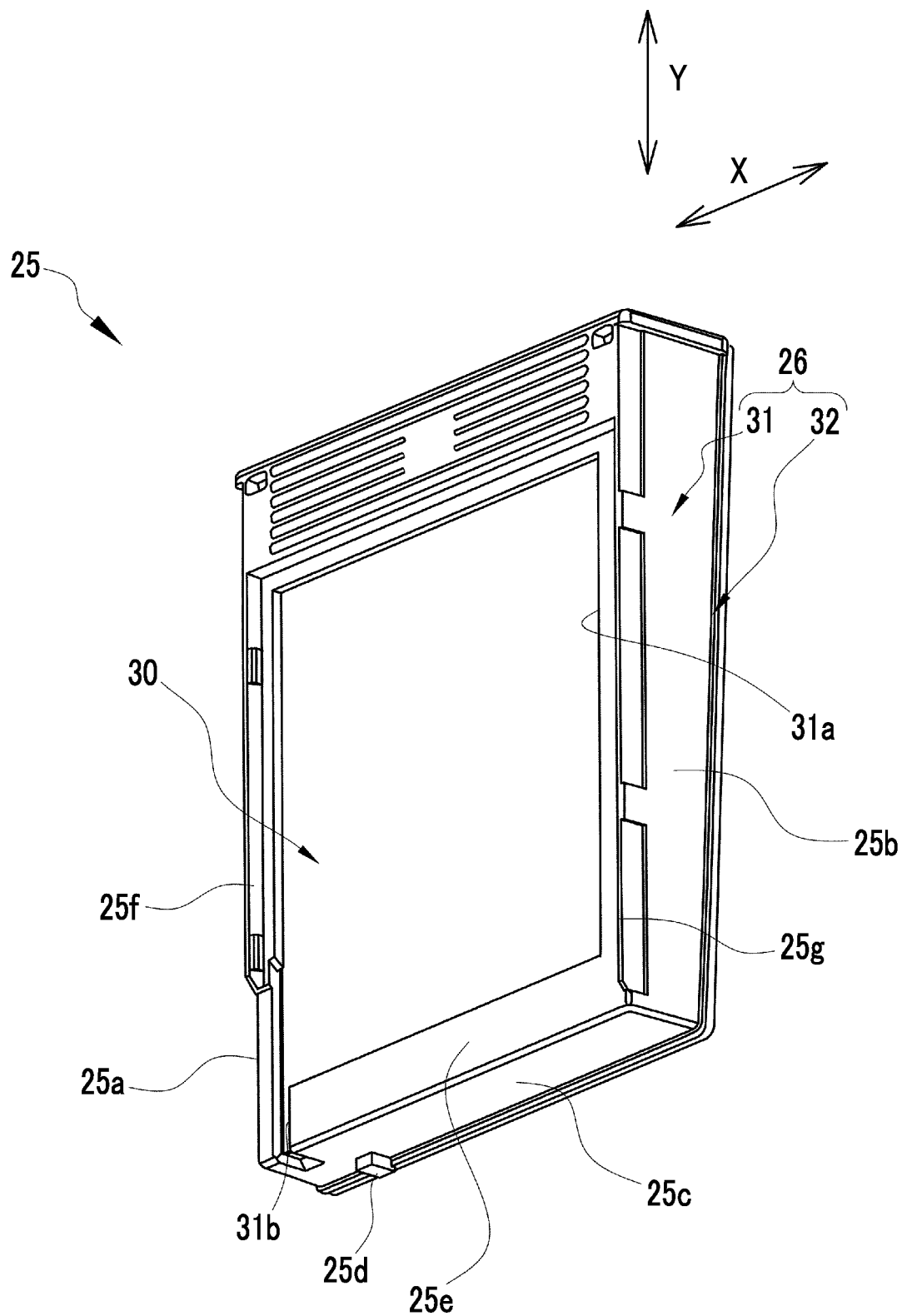
FIG. 11 is a perspective view of the second instant film pack as viewed from a bottom surface side.
Figure 12:
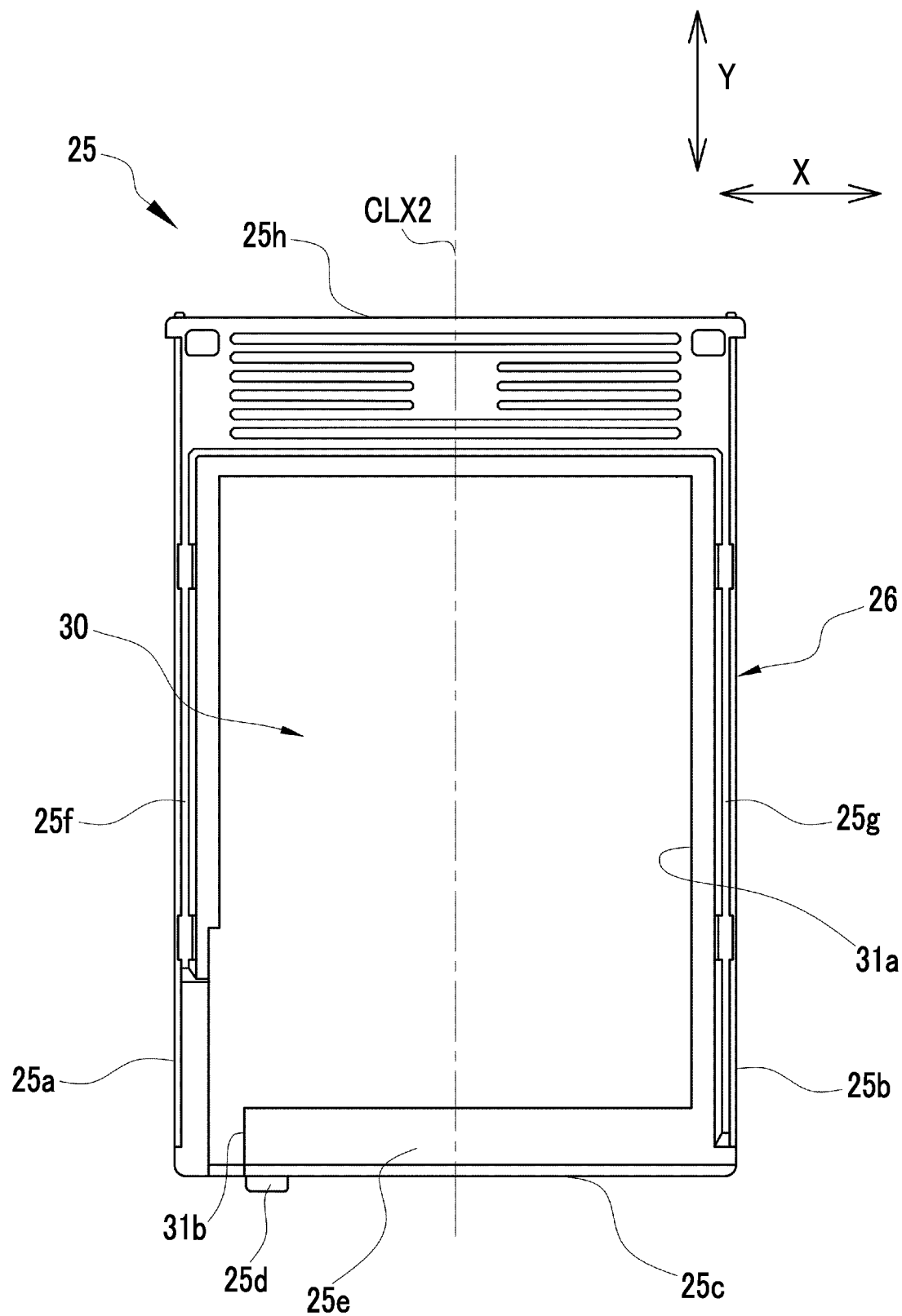
FIG. 12 is a front view of the second instant film pack.

As shown in FIGS. 11 and 12, the L-shaped protrusions 24c present in the first instant film pack 24 are not provided on both side surfaces 25a and 25b of the second instant film pack 25. Instead, a protrusion 25d for reversal loading prevention is provided on a bottom surface 25c of the second instant film pack 25. The protrusion 25d is disposed at a position near one side surface 25a of the second instant film pack 25 with respect to a center line CLX2 (see FIG. 12) of the second instant film pack 25 in the width direction X.

The protrusion 25d is integrally formed with the case 26 of the second instant film pack 25. The protrusion 25d is formed in a cuboid shape protruding from the bottom surface 25c of the second instant film pack 25.

A pair of ribs 25f and 25g are provided on a front surface 25e of the second instant film pack 25. The ribs 25f and 25g are positioned on both sides of the exposure opening 31a, extend in parallel with the transport direction Y (length direction) of the second instant film pack 25, and protrude forward in a thickness direction along the side surfaces 25a and 25b of the second instant film pack 25. Since one rib 25f is adjacent to the cut-off portion 31b into which the claw member 57 (see FIGS. 14 and 15) is inserted, a lower end portion is cut off so as not to interfere with the claw member 57. Accordingly, the dimension in the transport direction Y is formed shorter than the dimension of the other rib 25g.

[Configuration of Second Instant Film]

Figure 13:
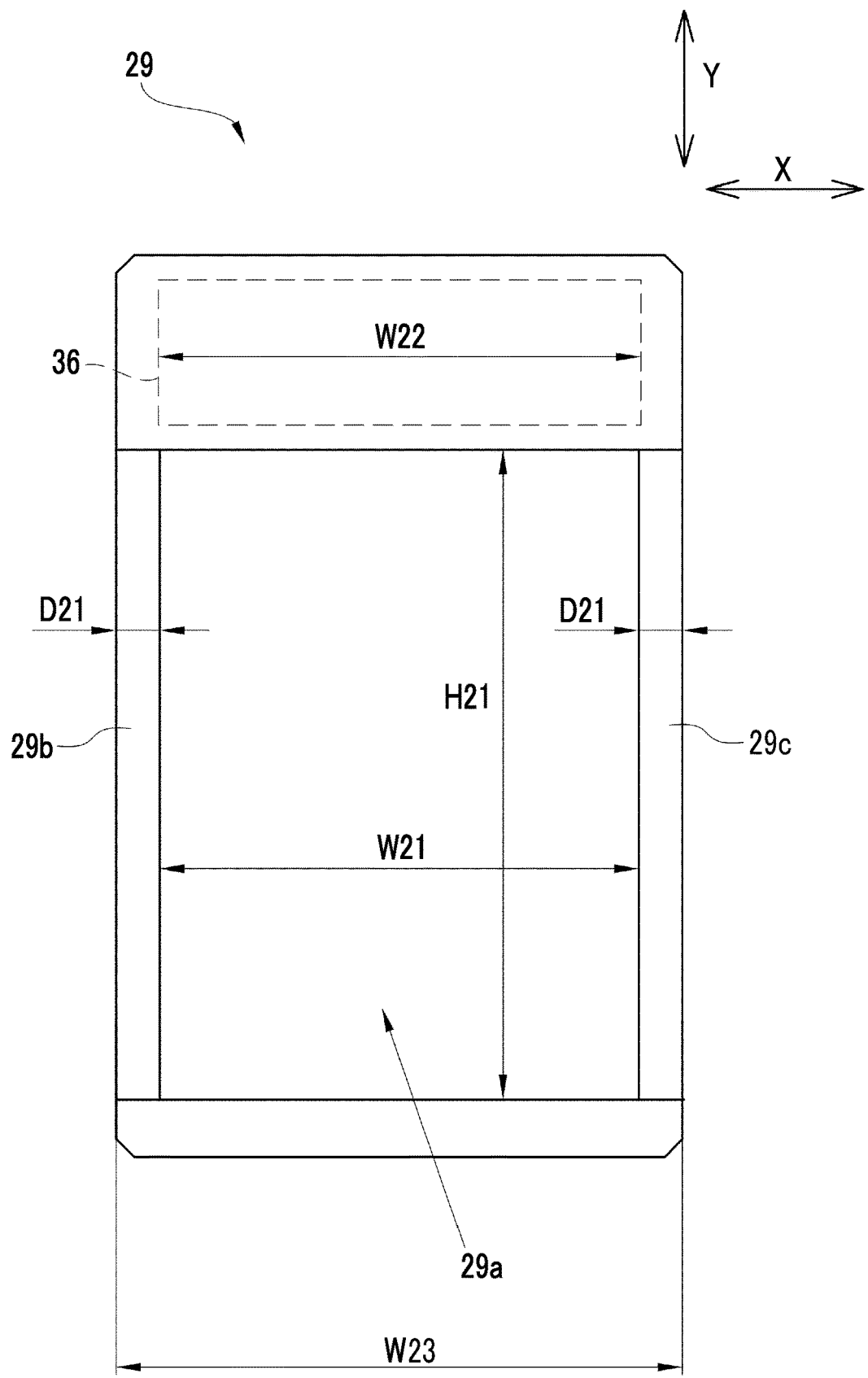
FIG. 13 is a front view of a second instant film.

As shown in FIG. 13, the second instant film 29 is a mono-sheet type film similar to the first instant film 28 except for the difference in size. Similar to the first instant film 28, the second instant film 29 includes a mask sheet 33, a photosensitive sheet 34, a cover sheet 35, a developer pod 36, a trap portion 37, and the like. Hereinafter, parts having the same functions as the parts of the first instant film 28 are given by the same references and the description thereof will be omitted.

Of the second instant film 29, in the width direction X of the second instant film 29, portions outside both ends of an exposure surface 29a and the developer pod 36 are side edge portions 29b and 29c. In the second instant film 29, a dimension W22 of the developer pod 36 in the width direction X is equal to a dimension W21 of the exposure surface 29a in the width direction X. A case where the dimensions in the width direction X are equal to each other includes a case where the dimensions in the width direction are substantially equal to each other. In the case of the example shown in FIG. 13, for example, the dimension W21 of the exposure surface 29a in the width direction X is 46 mm, a dimension H21 in the transport direction Y orthogonal to the width direction X is 62 mm, and dimensions D21 of the side edge portions 29b and 29c in the width direction X are 4 mm. In this case, a dimension W23 of the second instant film 29 in the width direction X is 54 mm. That is, all the dimensions of the portions of the second instant film 29 in the width direction are smaller than the dimensions of the portions of the first instant film 28.

[Configuration of Printer Unit]

Figure 14:
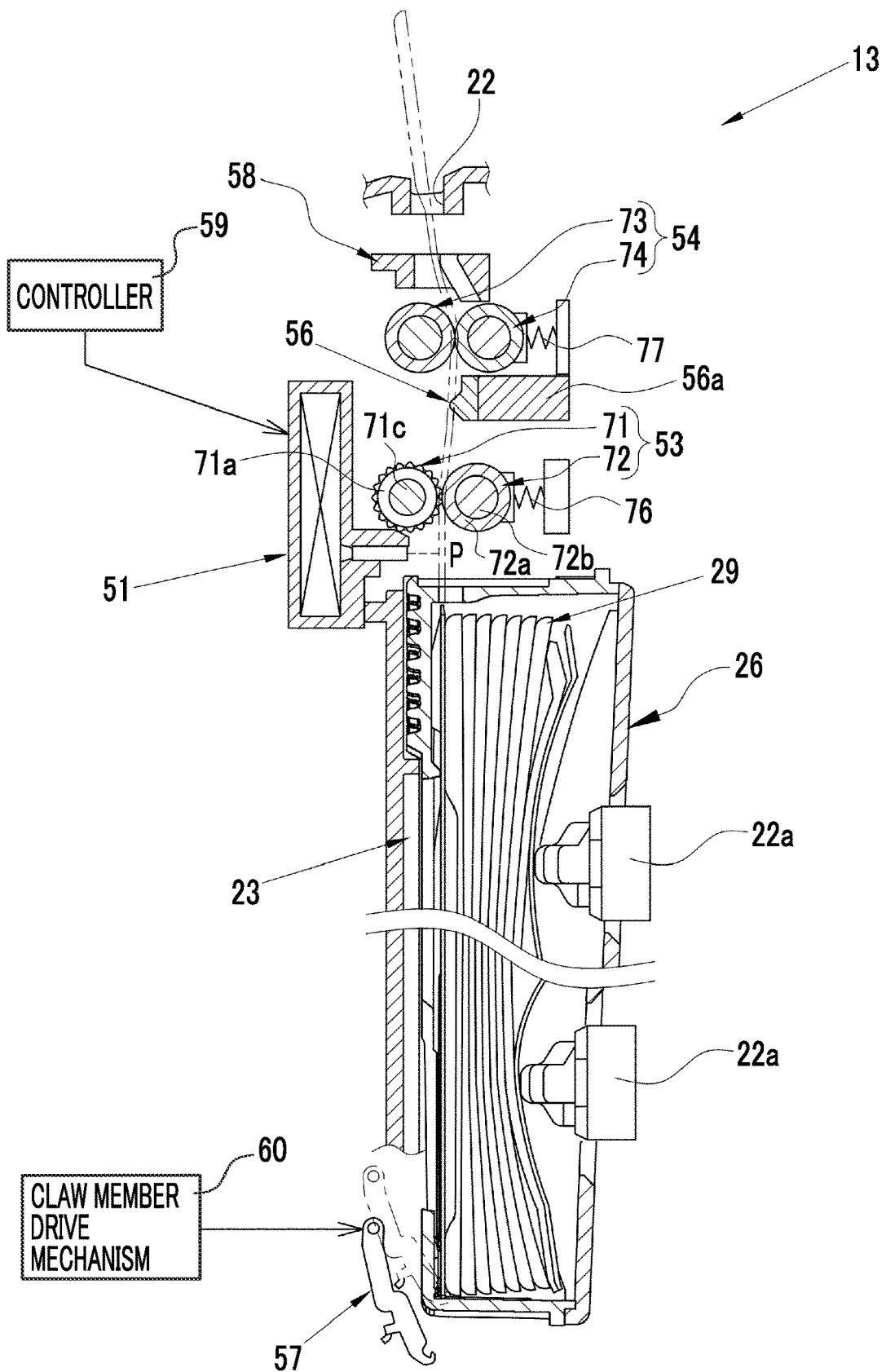
FIG. 14 is a cross-sectional view of a printer unit.
Figure 15:
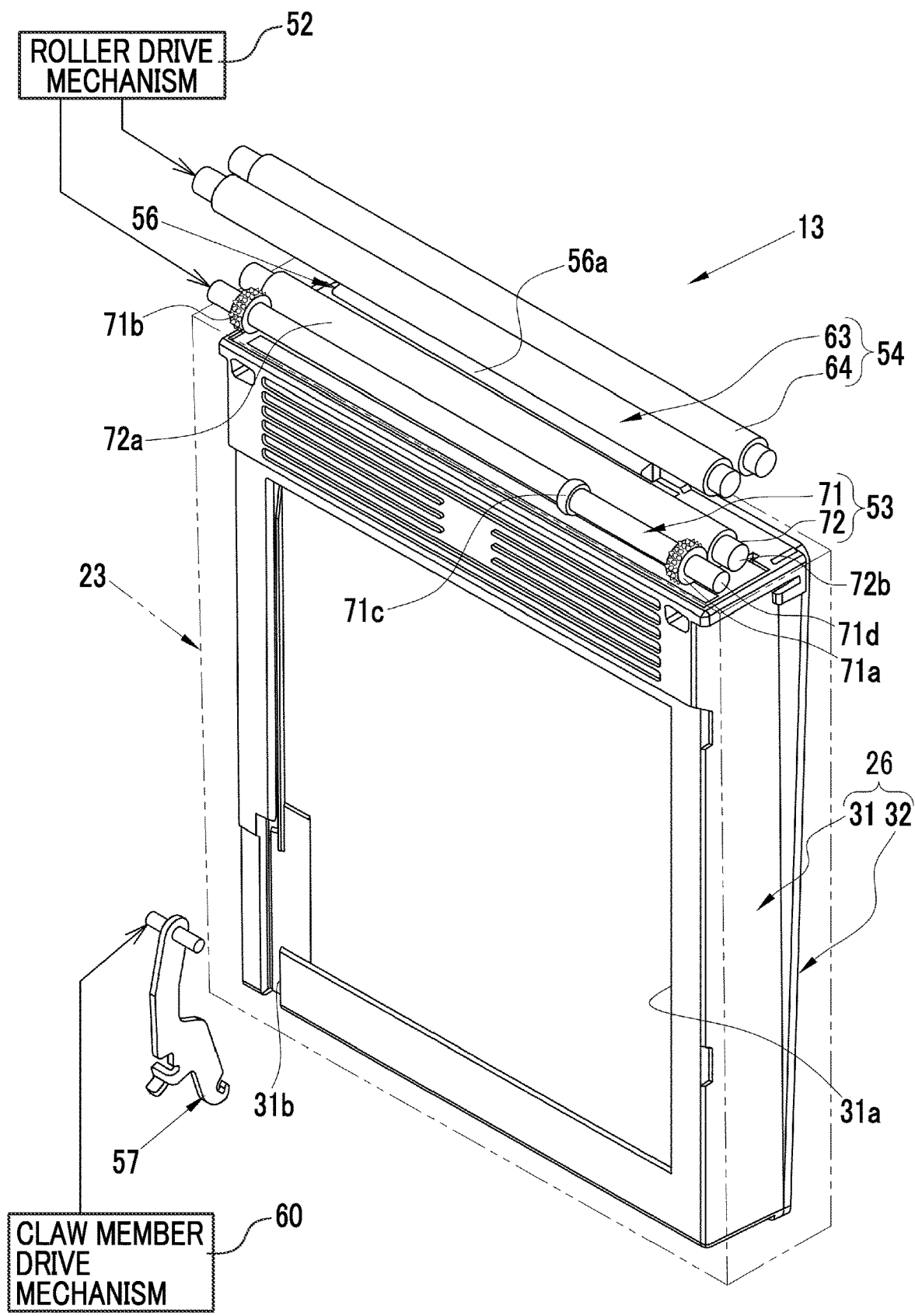
FIG. 15 is a perspective view of the printer unit.

As shown in FIGS. 14 and 15, the printer unit 13 is configured of the exposure head 51, a roller drive mechanism 52, a transport roller pair 53, the spreading roller pair 54, a spreading control member 56, the film pack room 23 (see FIGS. 16 and 17), the claw member 57, an ejection guide 58, a controller 59, and a claw member drive mechanism 60. The transport roller pair 53 and the roller drive mechanism 52 constitute a transport mechanism in the claims. The claw member 57 and the claw member drive mechanism 60 constitute a discharge mechanism in the claims.

[Configuration of First Position Alignment Unit and Second Position Alignment Unit of Film Pack Room]

Figure 16:
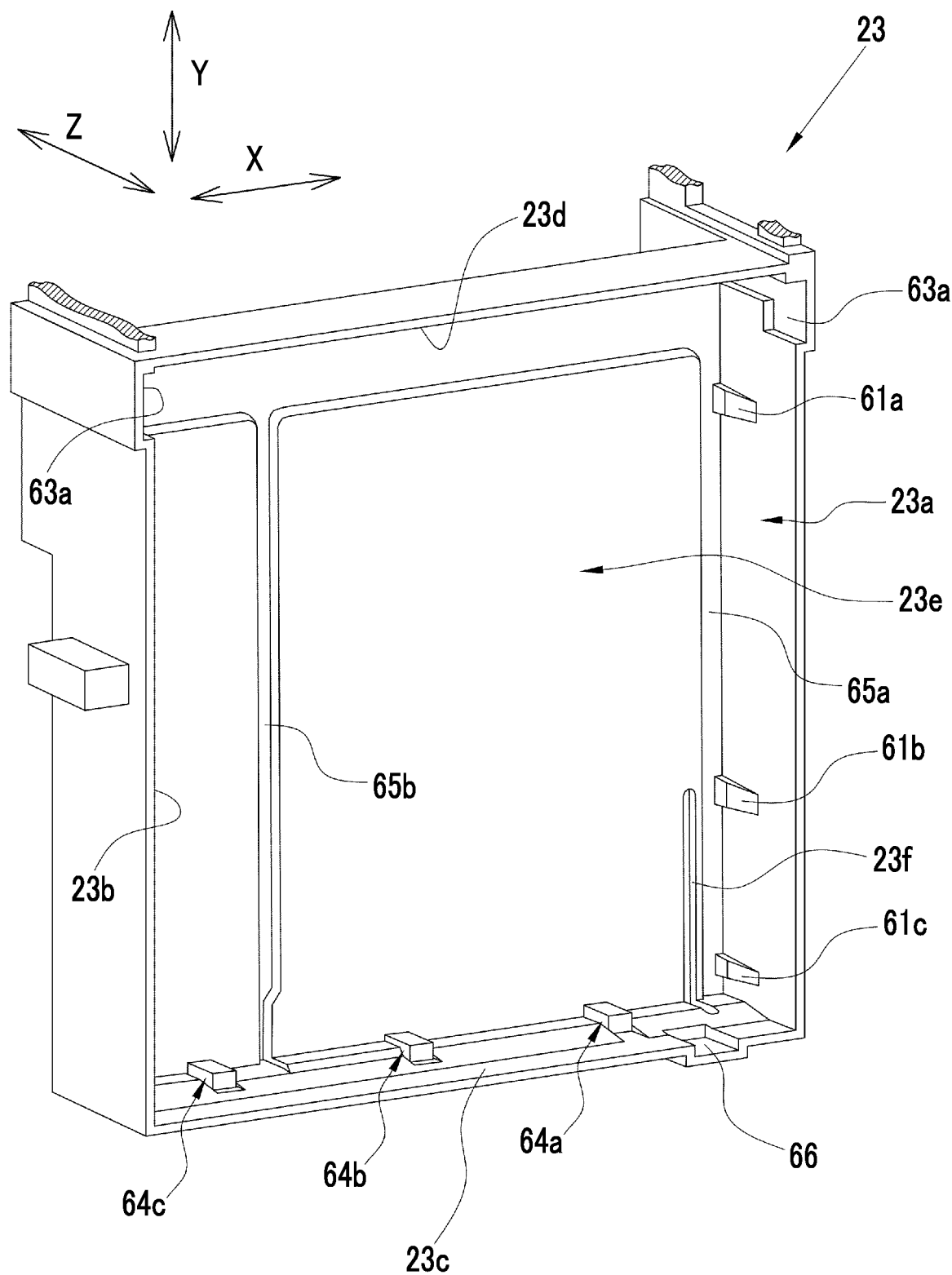
FIG. 16 is a perspective view of a film pack room.
Figure 17:
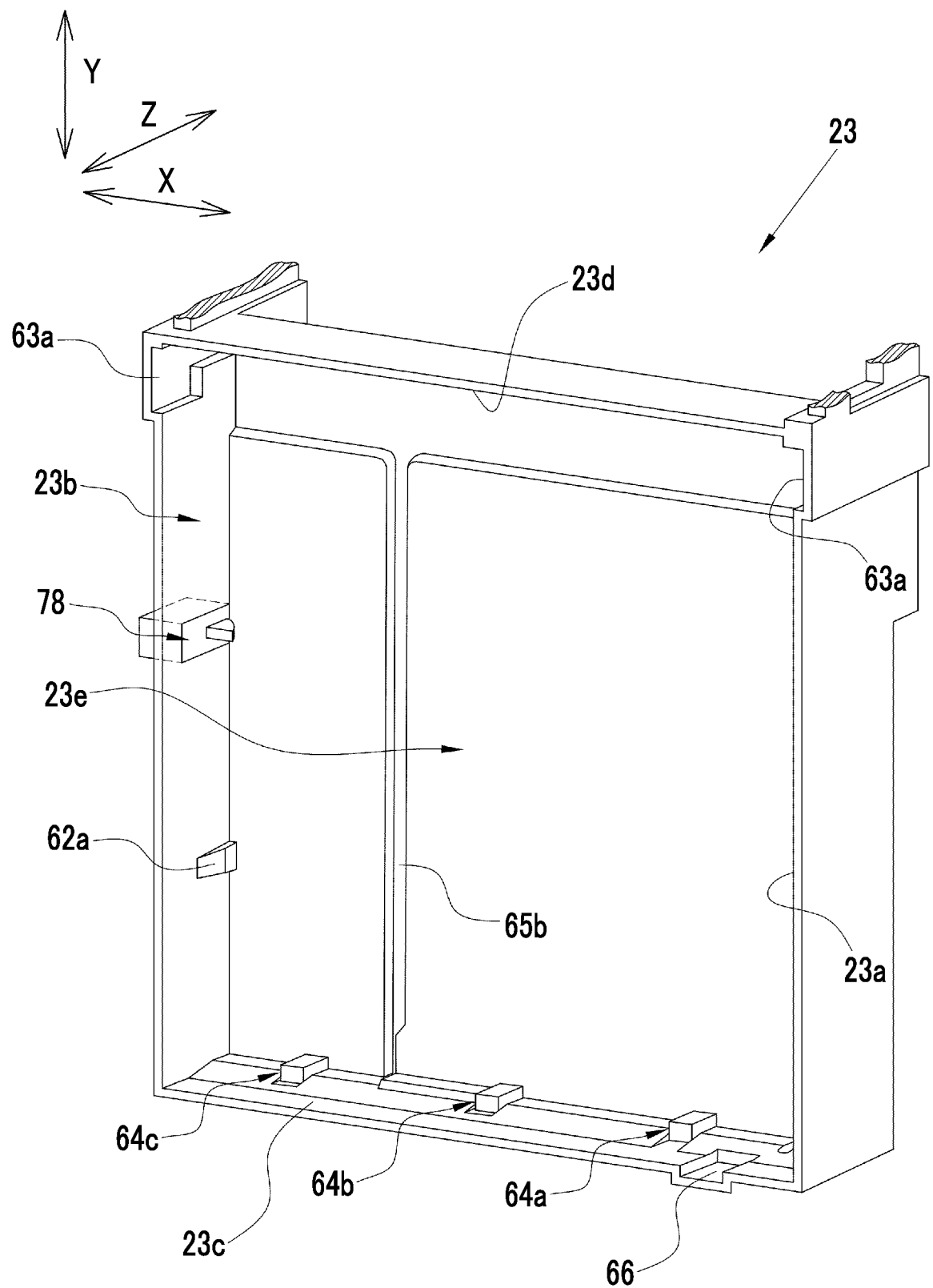
FIG. 17 is a perspective view of the film pack room viewed from another angle.

As shown in FIGS. 16 and 17, the film pack room 23 is formed in a box shape in which the rear surface side of the camera body 11 is opened. Position alignment protrusions 61a to 61c and 62a for aligning the first instant film pack 24 in the width direction X are provided in the film pack room 23. The position alignment protrusions 61a to 61c and 62a constitute a first position alignment unit in the claims.

The position alignment protrusions 61a to 61c are provided on a right side surface 23a of the film pack room 23, and the position alignment protrusion 62a is provided on a left side surface 23b of the film pack room 23. The position alignment protrusions 61a to 61c and 62a are formed in a wedge shape in which a thickness gradually increases along a loading direction Z of the first instant film pack 24, that is, a front-rear direction of the camera body 11.

L-shaped cut-off portions 63a are formed on both side surfaces 23a and 23b of the film pack room 23. The L-shaped cut-off portions 63a prevent the first instant film pack 24 from being reversely loaded by being fitted with the L-shaped protrusions 24c provided on both the side surfaces 24a and 24b of the first instant film pack 24.

Figure 18:
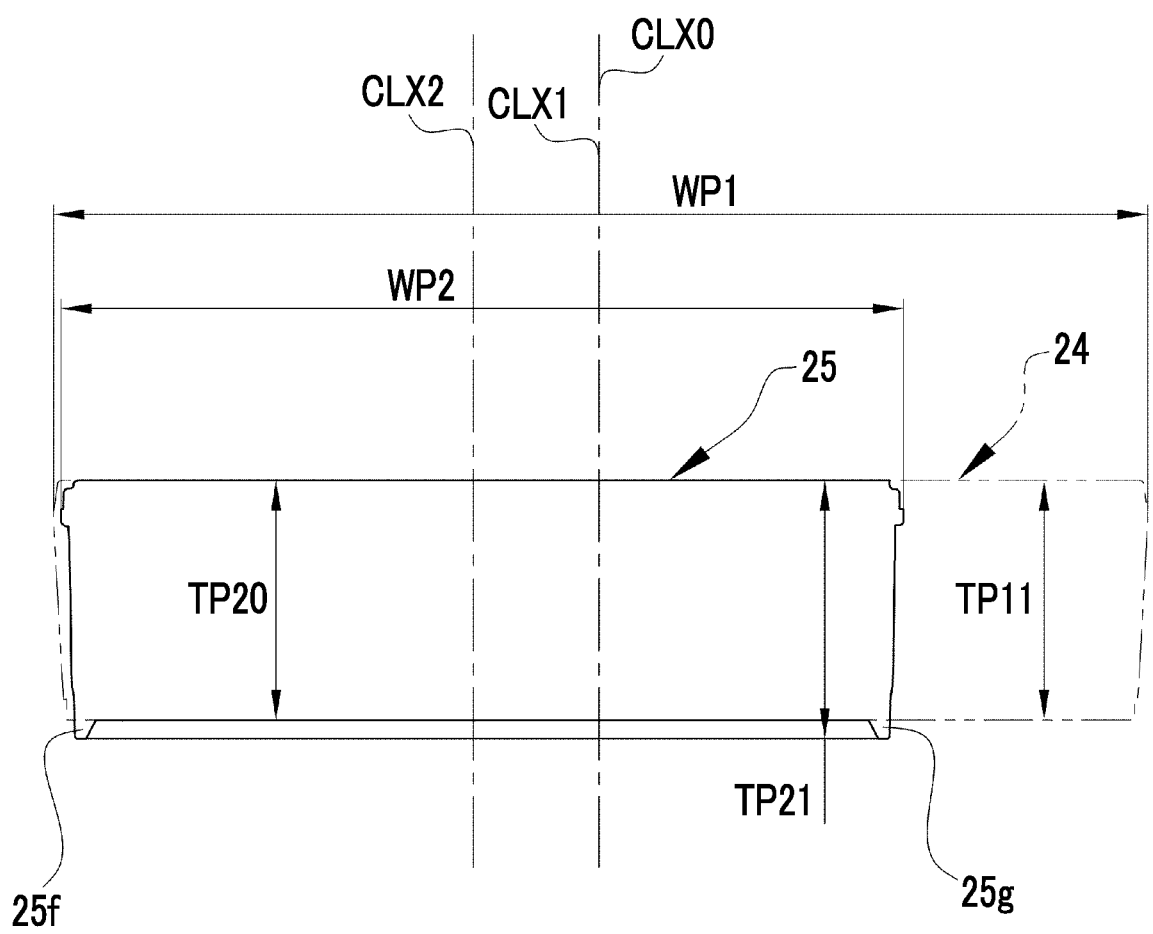
FIG. 18 is an explanatory diagram for comparing dimensions of the first instant film pack and the second instant film pack.

FIG. 18 shows only contour shapes superimposed in order to compare the dimensions of the first and second instant film packs 24 and 25. FIG. 18 shows the first and second instant film packs 24 and 25 aligned by the first and second position alignment units and the contour shapes in a case where the first instant film pack 24 (shape represented by a dashed double-dotted line) and the second instant film pack 25 (shape represented by a solid line) are viewed along the transport direction Y.

A dimension WP1 of the first instant film pack 24 in the width direction X is formed to be larger than a dimension WP2 of the second instant film pack 25 in the width direction X. In a case where a direction parallel to the loading direction Z and orthogonal to the width direction X is a thickness direction, the second instant film pack 25 has a stepped portion in which a dimension TP21 in the thickness direction is larger than a surrounding dimension TP20. This stepped portion is a portion including the ribs 25f and 25g. The dimension TP21 of the portion of the second instant film pack 25 including the ribs 25f and 25g in the thickness direction is larger than a dimension TP11 of the first instant film pack 24 in the thickness direction. The first instant film pack 24 has a shape having a substantially constant thickness in which steps are less in the thickness direction.

On the other hand, in the second instant film pack 25, the dimension TP20 of a portion not including the ribs 25f and 25g in the thickness direction is equal to or less than the dimension TP11 of the first instant film pack 24 in the thickness direction. That is, the contour shape of the second instant film pack 25 is formed such that only the portion including the ribs 25f and 25g protrudes from the contour shape of the first instant film pack 24.

Figure 19:
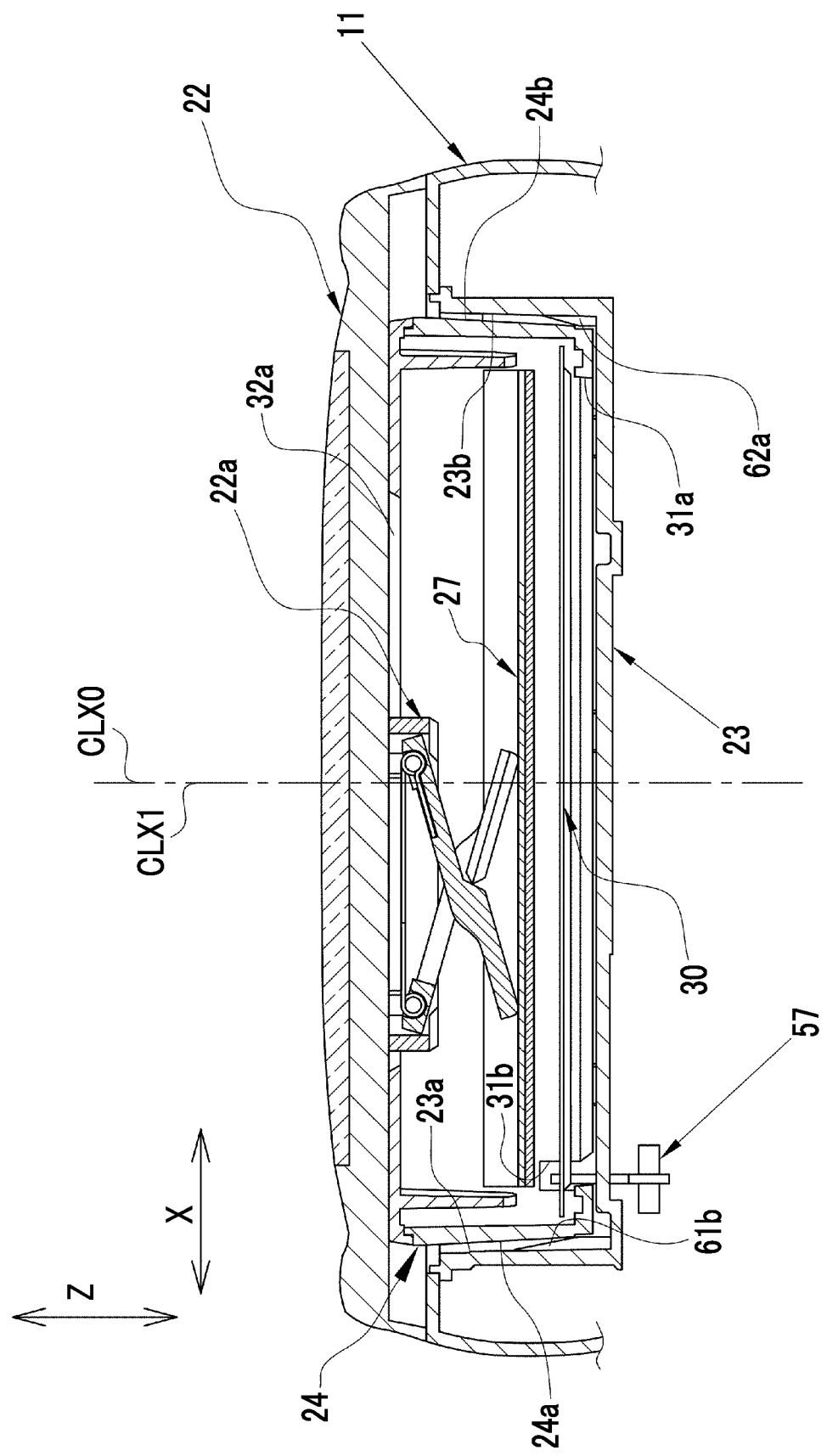
FIG. 19 is a traversal cross-sectional view of a digital camera with a printer into which the first instant film pack is loaded.
Figure 20:
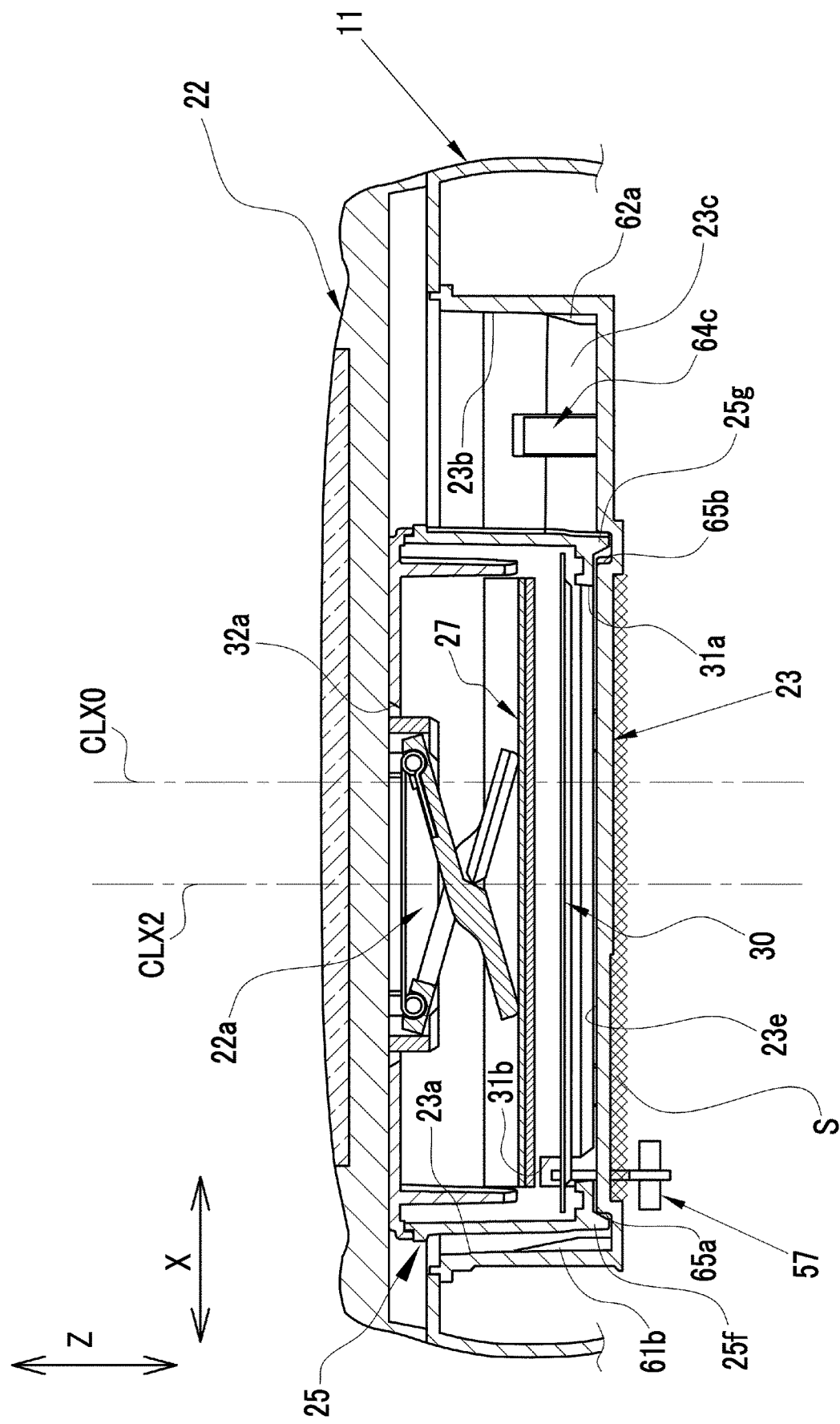
FIG. 20 is a traversal cross-sectional view of the digital camera with a printer into which the second instant film pack is loaded.

As described above, the dimension WP1 of the first instant film pack 24 in the width direction X is formed to be larger than the dimension WP2 of the second instant film pack 25 in the width direction X. Accordingly, as shown in FIG. 19, both the side surfaces 24a and 24b of the first instant film pack 24 touch the position alignment protrusions 61a to 61c and 62a, and thus, the position alignment in the width direction X can be performed. Specifically, the position alignment protrusions 61a to 61c and 62a touch both the side surfaces 24a and 24b, and thus, a center line CLX1 of the first instant film pack 24 in the width direction X and a center line CLX0 of the film pack room 23 in the width direction X can coincide with each other. A case where the center lines coincide with each other includes a case where the center line CLX1 and the center line CLX0 substantially coincide with each other. In FIGS. 19 and 20, in order to prevent the drawings from becoming complicated, the stacked first and second instant films 28 and 29 are not shown.

Since the position alignment protrusions 61a to 61c and 62a are formed in the wedge shape, in a case where the first instant film pack 24 is pushed into the film pack room 23 in the loading direction, both the side surfaces 24a and 24b of the first instant film pack 24 securely touch the position alignment protrusions 61a to 61c and 62a. Since the second instant film pack 25 is aligned by position alignment grooves 65a and 65b to be described later, the position alignment protrusions 61a to 61c and 62a are not used.

Elastic members 64a to 64c (see FIGS. 16 and 17) for aligning the first and second instant film packs 24 and 25 in the transport direction Y are provided on a bottom surface 23c of the film pack room 23. The elastic members 64a to 64c are cuboid members made of sponge or rubber, and are arranged at predetermined intervals along the width direction X. In a case where both the side surfaces 24a and 24b of the first instant film pack 24 touch the position alignment protrusions 61a to 61c and 62a and the L-shaped protrusions 24c are fitted into the L-shaped cut-off portions 63a, the bottom surface 24d of the first instant film pack 24 simultaneously touches the elastic members 64a to 64c. The elastic members 64a to 64c that touch the bottom surface 24d of the first instant film pack 24 are in a compressed state. Accordingly, an elastic force in a case where the elastic members 64a to 64c try to return from the compressed state to the state before compression acts, and a top surface 24e of the first instant film pack 24 is pressed against a top surface 23d of the film pack room 23. The top surface 23d of the film pack room 23 has an opening portion connected to the transport roller pair 53.

On the other hand, the position alignment grooves 65a and 65b for aligning the second instant film pack 25 in the width direction X are provided in the film pack room 23. The position alignment grooves 65a and 65b constitute a second position alignment unit in the claims.

The position alignment grooves 65a and 65b are formed on a front surface 23e of the film pack room 23 (a surface facing the exposure openings 31a of the first and second instant film packs 24 and 25). The position alignment groove 65a is disposed at a position near the right side surface 23a of the film pack room 23. The position alignment groove 65b is disposed at a position spaced apart from the position alignment groove 65a at a predetermined interval. A width and an interval between the position alignment grooves 65a and 65*b* match a width and an interval between the ribs 25*f* and 25*g* of the second instant film pack 25.

Figure 21:
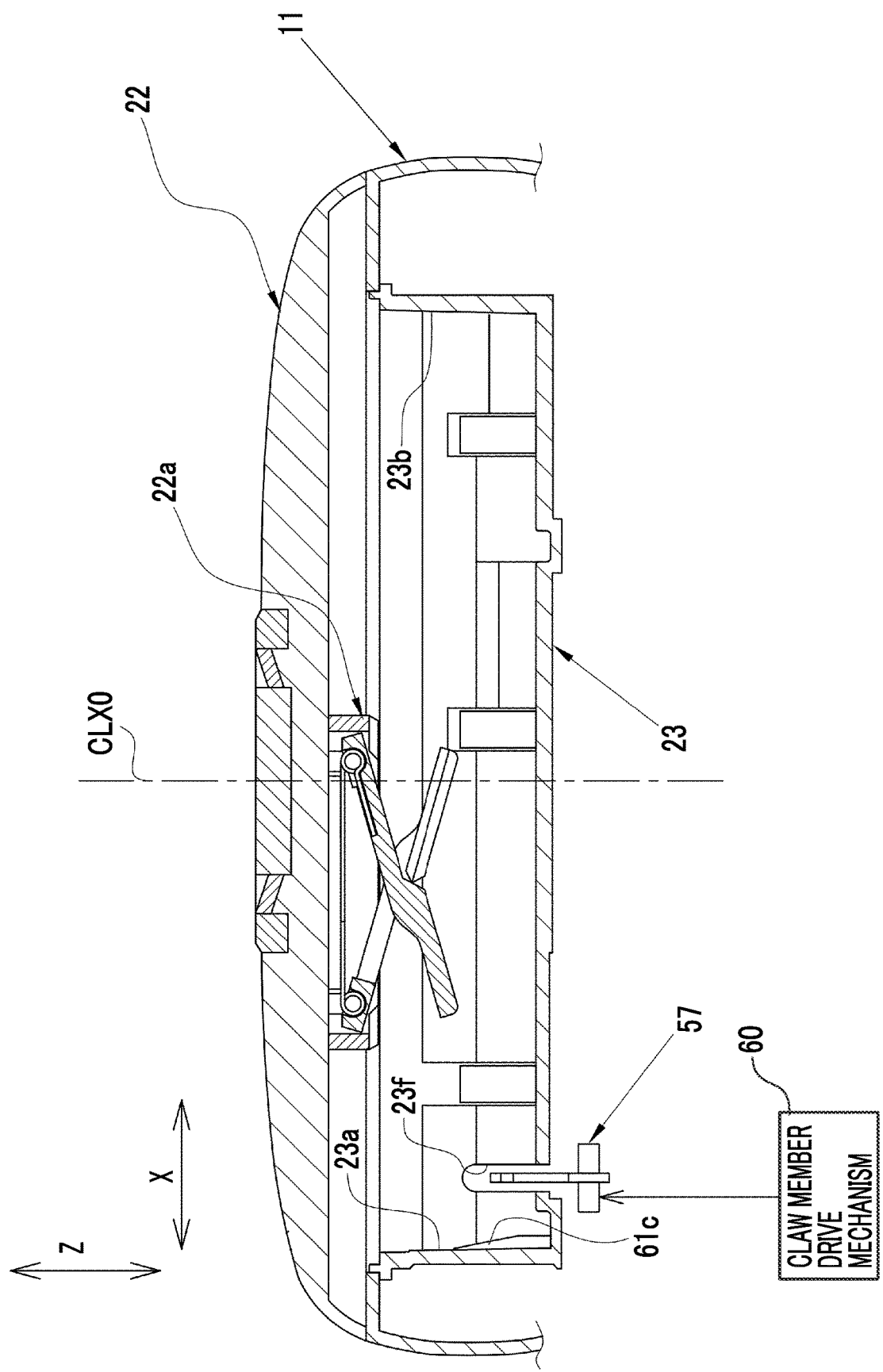
FIG. 21 is a traversal cross-sectional view of the digital camera with a printer showing a configuration around a cut-off portion in a loading room.

The film pack room 23 includes a cut-off portion 23*f* (see FIG. 16 and FIG. 21). The cut-off portion 23*f* is formed at a position facing the cut-off portions 31*b* of the first and second instant film packs 24 and 25, and is continuous with the bottom surface of the film pack room 23. The claw member 57 enters the inside of the first and second instant film packs 24 and 25 through the cut-off portion 23*f*, and the first and second instant films 28 and 29 are discharged one by one outwards from the first and second instant film packs 24 and 25.

As shown in FIG. 21, the cut-off portion 23*f* is disposed at a position closer to the right side surface 23*a* than the center of the film pack room 23 in the width direction X. The cut-off portions 31*b* of the first and second instant film packs 24 and 25 loaded into the film pack room 23 are also formed at positions close to the one side surfaces 24*a* and 25*a* of the first and second instant film packs 24 and 25 according to the position of the cut-off portion 23*f*. In FIG. 21, in order to prevent the drawings from becoming complicated, the first and second instant film packs 24 and 25 are not shown.

The claw member 57 is disposed at a position aligned with the cut-off portion 23*f*. Specifically, the claw member 57 is disposed at a position closer to the right side surface 23*a* than the center line CLX0 of the film pack room 23 in the width direction X. The claw member drive mechanism 60 is a well-known mechanism that is configured of a motor as a drive source, a gear train, a spring member, and the like as a drive source, and reciprocates the claw member (see FIG. 14).

As described above, the second instant film pack 25 has a smaller dimension in the width direction X than the first instant film pack 24, and the dimension TP21 of the portion including the ribs 25*f* and 25*g* in the thickness direction is larger than the dimension TP11 of the first instant film pack 24 in the thickness direction. Thus, as shown in FIG. 20, the position alignment in the width direction X can be performed by fitting the ribs 25*f* and 25*g* into the position alignment grooves 65*a* and 65*b* (second position alignment unit) positioned inside the film pack room 23 in the width direction X with respect to the position alignment protrusions 61*a* to 61*c* and 62*a* (first position alignment unit). Specifically, the ribs 25*f* and 25*g* are fitted into the position alignment grooves 65*a* and 65*b*, and thus, the center line CLX2 of the second instant film pack 25 in the width direction X can be aligned with the center line CLX0 of the film pack room 23 in the width direction X to be shifted to the right side surface 23*a*.

The position alignment of the second instant film pack 25 is not merely shifted, but the right side surface 25*a* of the second instant film pack 25 aligned by the ribs 25*f* and 25*g* is aligned with respect to the right side surface 24*a* of the first instant film pack 24 aligned by the position alignment protrusions 61*a* to 61*c* and 62*a* so as to be shifted to the inside of the film pack room 23 by about 0.5 mm. Accordingly, as will be described later, the image can be exposed in an appropriate exposure range by absorbing a dimensional difference between both the side edge portions 28*b* and 28*c* of the first instant film 28 and both the side edge portions 29*b* and 29*c* of the second instant film 29.

Since the second position alignment unit is configured of the position alignment grooves 65*a* and 65*b* fitted into the ribs 25*f* and 25*g*, a space S between the position alignment grooves 65*a* and 65*b* and opposite to the film pack room 23 (hatched location in FIG. 20) can be secured. Accordingly, parts and the like can be arranged in the space S, and the thickness of the printer as a whole can be further reduced. Although in a case where the second position alignment unit is not a groove but a recess portion having a large dimension in the width direction, the space S cannot be secured, in the present embodiment, since the second position alignment unit includes the position alignment grooves 65*a* and 65*b*, the space can be secured.

A cut-off portion 66 for reversal loading prevention is formed on the bottom surface 23*c* of the film pack room 23. The cut-off portion 66 for reversal loading prevention prevents the second instant film pack 25 from being reversely loaded by being fitted into protrusion 25*d* having the cuboid-shaped provided on the bottom surface 25*c* of the second instant film pack 25.

In a case where the ribs 25*f* and 25*g* of the second instant film pack 25 and the position alignment grooves 65*a* and 65*b* are fitted and the protrusion 25*d* and the cut-off portion 66 for reversal loading prevention are fitted, the bottom surface 25*c* of the second instant film pack 25 simultaneously touches the elastic members 64*a* and 64*b*. Since the second instant film pack 25 has a smaller dimension in the width direction than the first instant film pack 24, the bottom surface 25*c* does not touch the elastic member 64*c*. Accordingly, the elastic force acts from the elastic members 64*a* and 64*b*, and a top surface 25*h* of the second instant film pack 25 is pressed against the top surface 23*d* of the film pack room 23.

As described above, the first and second instant film packs 24 and 25 are aligned with respect to the film pack room 23 in the width direction X and the transport direction Y, and the position alignment in the loading direction Z is performed by closing the loading cover 22. Specifically, the pair of film holding portions 22*a* provided at the loading cover 22 align the first and second instant film packs 24 and 25 in the loading direction Z.

That is, in a case where one of the first and second instant film packs 24 and 25 is loaded into the film pack room 23 and the loading cover 22 is positioned in the closed position, the pair of film holding portions 22*a* pass through the openings 32*a*, are inserted into the first and second instant film packs 24 and 25, and press the film press plate 27. Accordingly, the first and second instant films 28 and 29 in the first and second instant film packs 24 and 25 are pressed in the stacking direction.

Figure 22:
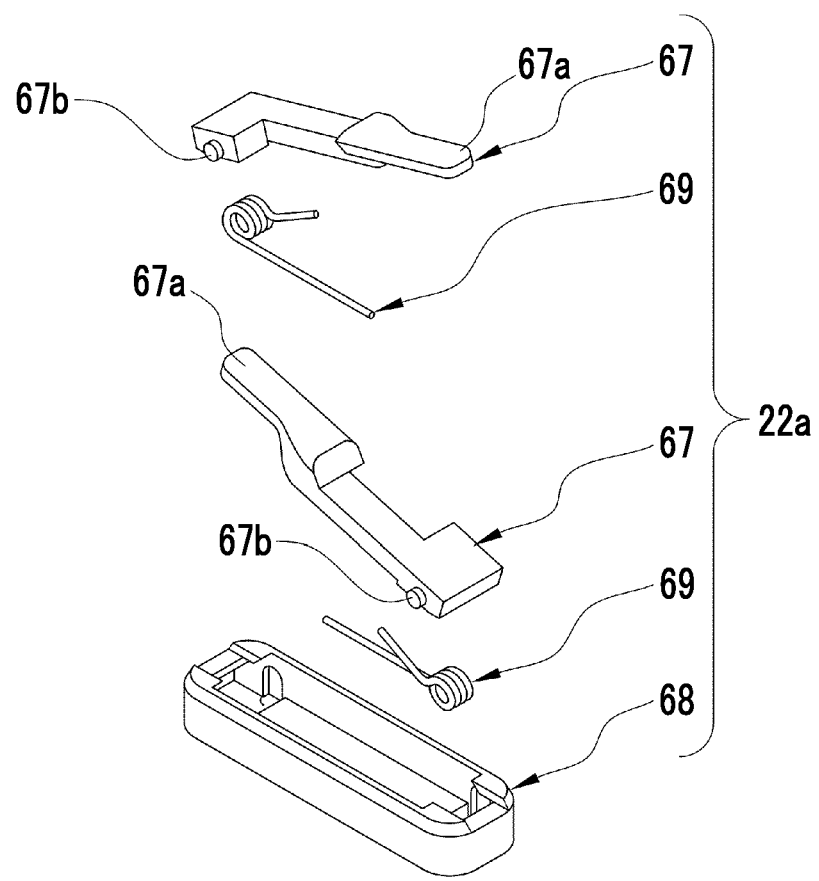
FIG. 22 is an exploded perspective view of a film holding portion.

As shown in FIG. 22, the film holding portion 22*a* is configured of a pair of press members 67, a holding frame 68, and springs 69. The holding frame 68 holds the press members 67, and is fixed to an inner wall surface side of the loading cover 22.

The pair of press members 67 face each other such that positions of distal end portions 67*a* and rotational shafts 67*b* are opposite to each other, and are held by the holding frame 68. For example, the holding frame 68 is fixed to the loading cover 22 through screwing. The springs 69 are torsion coil springs, and are attached between the press members 67 and the holding frame 68. The springs 69 urge the press members 67 such that the distal end portions 67*a* move rotationally upward in the drawing. Accordingly, the distal end portions 67*a* press the film press plate 27.

As described above, since the second instant film pack 25 has a smaller dimension in the width direction than the first instant film pack 24 and one position alignment groove 65*a* is disposed at a position near the right side surface 23*a* of the film pack room 23, the second instant film pack 25 is aligned with the film pack room 23 so as to be shifted to the right side surface 23*a*.

The pair of film holding portions 22a are arranged at positions corresponding to the second instant film pack 25, and are formed to have a small dimension in the width direction X so as to correspond to the opening 32a of the second instant film pack 25. Thus, in a case where the second instant film pack 25 is loaded into the film pack room 23 (state shown in FIG. 20), the film holding portions 22a enter the opening 32a so as to correspond to the positions, and the second instant film 29 is pressed in the stacking direction via the film press plate 27. Accordingly, the second instant film pack 25 is pressed against the front surface 23e of the film pack room 23 and is aligned in the loading direction Z.

On the other hand, the first instant film pack 24 has a larger dimension in the width direction than the second instant film pack 25, and the opening 32a of the first instant film pack 24 is formed so as to have a larger dimension in the width direction X than the opening 32a of the second instant film pack 25. The dimensions of the opening 32a of the first instant film pack 24 and the opening 32a of the second instant film pack 25 in the transport direction Y are substantially equal to each other. In a case where the first instant film pack 24 is loaded into the film pack room 23 (state shown in FIG. 19), the film holding portions 22a are arranged at the positions corresponding to the second instant film pack 25, that is, the positions shifted to one side with respect to the first instant film pack 24. However, since the opening 32a of the first instant film pack 24 has a long dimension in the width direction X, the film holding portions 22a enter, and the first instant film 28 is pressed in the stacking direction via the film press plate 27. Accordingly, the first instant film pack 24 is pressed against the front surface 23e of the film pack room 23 and is aligned in the loading direction Z.

The first and second instant film packs 24 and 25 are loaded as described above, and the image is recorded by the printer unit 13 on the first and second instant films 28 and 29 ejected from the first and second instant film packs 24 and 25.

The transport roller pair 53 and the spreading roller pair 54 are driven to be rotated by the roller drive mechanism 52, and transport the film cover 30 and the first and second instant films 28 and 29. The roller drive mechanism 52 includes, for example, a motor as a drive source and a transmission mechanism such as a gear train that transmits rotational drive. The transport roller pair 53 includes a capstan roller 71 and a pinch roller 72. The capstan roller 71 and the pinch roller 72 are arranged at positions at which these rollers pinch a transport path of the first instant film 28.

The capstan roller 71 is disposed on a side (a left side of the transport path in the diagram) facing the exposure surfaces 28a and 29a of the first and second instant films 28 and 29. The capstan roller 71 includes a pair of columnar spike roller members 71a and 71b, a sub roller member 71c, and a rotational shaft 71d that holds each spike roller member 71a and the sub roller member 71c.

A spike (not shown) including a plurality of small protrusions (convex portions) is formed on a circumferential surface of the spike roller member 71a. A holding force of the spike roller member 71a is further improved by the protrusions. The number and shape of protrusions may be appropriately designed. The protrusion includes a small convex and a small concave formed by filing the circumferential surface of the spike roller member 71a. The sub roller member 71c is formed in a smooth curved surface shape in which a cross section cut along a plane including an axial direction and a diametrical direction is convex outward.

Figure 23:
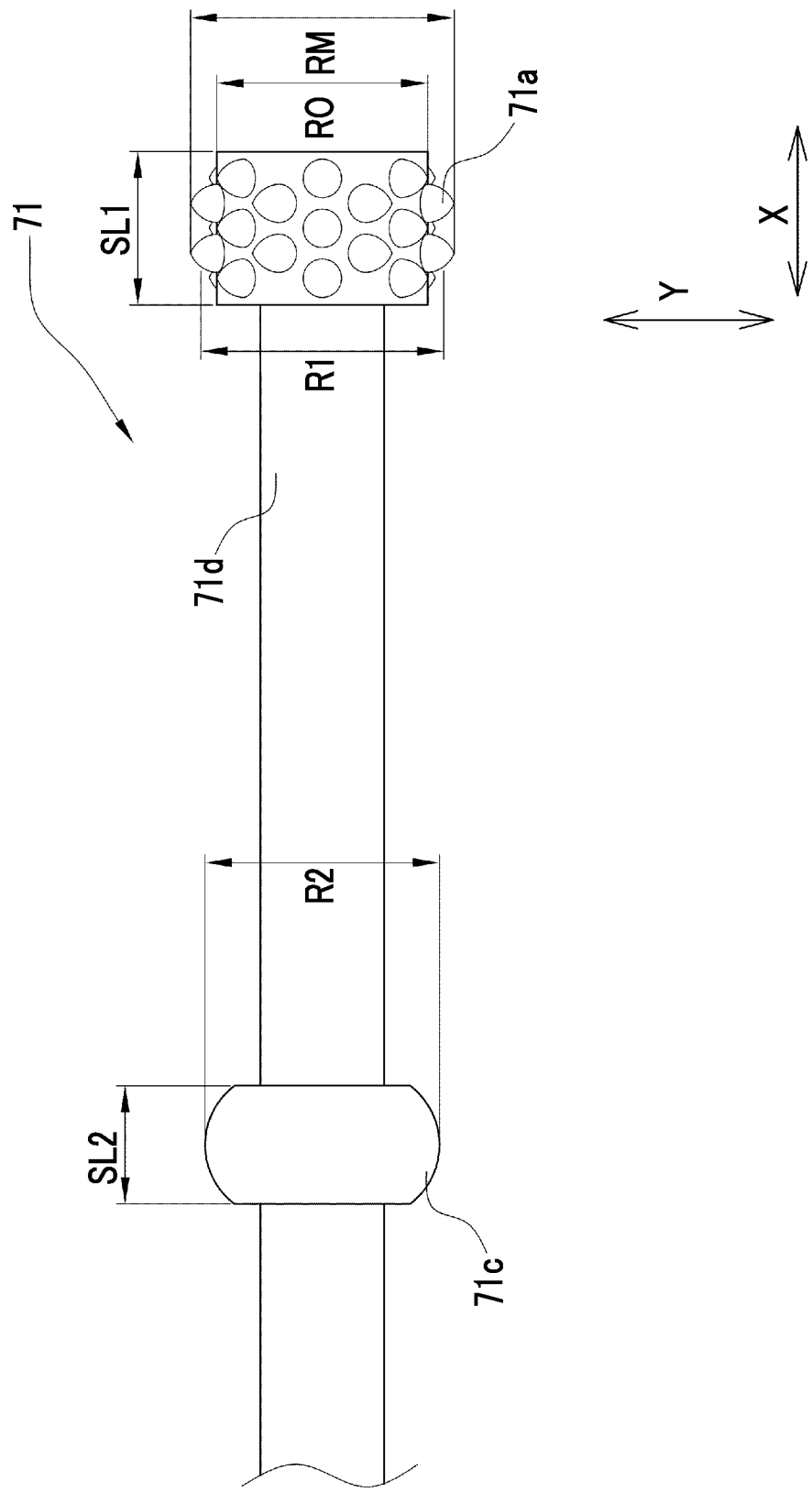
FIG. 23 is an explanatory diagram showing dimensions of a spike roller member and a sub roller member.

As shown in FIG. 23, in a case where an average value of a maximum outer diameter RM including a distal end of the convex portion of the spike roller member 71a or 71b and a minimum outer diameter RO not including the convex portion is an effective outer diameter R1 of the spike roller member 71a or 71b, it is preferable that an outer diameter R2 of the sub roller member 71c is smaller than the effective outer diameter R1 of the spike roller member 71a or 71b and is larger than the minimum outer diameter RO of the spike roller member 71a or 71b.

It is preferable that a dimension SL2 of the sub roller member 71c in the width direction X is smaller than a dimension SL1 of the spike roller member 71a or 71b in the width direction X. It is preferable that the dimension SL1 of the spike roller member 71a or 71b in the width direction X is 1.4 mm and the dimension SL2 of the sub roller member 71c in the width direction X is 1.2 mm.

As shown in FIG. 14, the pinch roller 72 is disposed on a side (a right side of the transport path in the diagram) facing the positive image observation surface 40 (see FIG. 8) of the first instant film 28. The pinch roller 72 includes a roller member 72a and a rotational shaft 72b. Both end portions of the roller member 72a are supported so as to freely move by a support member (not shown) within a thickness range of the first instant film 28, and are pressed toward the capstan roller 71 by springs 76 as press mechanisms. Thus, the pinch roller 72 is elastically supported in a direction orthogonal to the transport direction of the first instant film 28.

The transport roller pair 53 transports the first and second instant films 28 and 29 discharged out from the first and second instant film packs 24 and 25 by the claw member 57 toward the spreading roller pair 54. The configuration for transporting the first and second instant films 28 and 29 by the transport roller pair 53 will be described later. An exposure position P (see FIG. 14) at which the exposure head 51 exposes the print light to the first and second instant films 28 and 29 is positioned between the discharge ports 31c of the first and second instant film packs 24 and 25 and the transport roller pair 53. The exposure using the exposure head 51 is performed for a period during which the instant film is transported by the transport roller pair 53.

The exposure is performed by sequentially exposing line images on the first and second instant films 28 and 29 by the exposure head 51 while moving the first and second instant films 28 and 29 for each line. Accordingly, an image corresponding to a single screen is exposed on the photosensitive layer of the first and second instant films 28 and 29. The first and second instant films 28 and 29 are subsequently transported toward the spreading roller pair 54 by the transport roller pair 53.

Since the first and second instant films 28 and 29 have different dimensions in the width direction X, the exposure of the line images by the exposure head 51 is also different. The exposure by the exposure head 51 is switched according to the signal of the detection switch 78 provided in the film pack room 23, as will be described later.

The spreading roller pair 54 includes spreading rollers 73 and 74, and is disposed on a downstream side of the transport roller pair 53 in the transport direction. The spreading roller 73 is disposed on a side (the left side of the transport path in the diagram) facing the exposure surfaces 28a and 29a of the first and second instant films 28 and 29. The spreading roller 74 is disposed on a side (the right side of the transport path in the diagram) facing the image observation surfaces of the first and second instant films 28 and 29. Both end portions of the spreading roller 74 are supported so as to freely move within the thickness range of the first and second instant films 28 and 29 by a support member (not shown), and are pressed toward the spreading roller 73 by springs 77 as press mechanisms. Thus, the spreading roller 74 is elastically supported in a direction orthogonal to the transport direction of the first instant film 28.

Although not shown, driving gears are attached to one-side shaft end portions of the spreading rollers 73 and 74, and both the driving gears mesh each other. The motor is connected to one of the driving gears through an intermediate gear. Thus, in a case where the motor rotates, the spreading rollers 73 and 74 are rotated in synchronization with the motor.

The ejection guide 58 is disposed on the downstream side of the spreading roller pair 54 in the transport direction. The spreading roller pair 54 transports the first instant film 28 transported by the transport roller pair 53 toward the ejection guide 58 while sandwiching the first instant film over the entire width. The first instant film is sandwiched by the spreading roller pair 54, and thus, the developer pod 36 of the first instant film 28 is crushed. Accordingly, the developer is spread (unfolded) into the gap 39 (see FIG. 8). The first instant film 28 discharged from the spreading roller pair 54 is transported toward the ejection guide 58.

The spreading control member 56 is provided between the transport roller pair 53 and the spreading roller pair 54. The spreading control member 56 touches the positive image observation surface 40 of the transported first instant film 28, and rubs the positive image observation surface 40 of the first instant film 28. Thus, the spreading control member 56 that controls a distribution of developer being spread extends in a direction parallel to the width direction of the first instant film 28 being transported and orthogonal to the transport direction of the first instant film 28. The spreading control member 56 is formed integrally with a plate-shaped support member 56a, and is fixed to the camera body 11 through the support member 56a.

A distal end of the spreading control member 56 protrudes toward the first instant film 28 from a sandwiching position at which the spreading roller pair 54 sandwiches the first instant film 28 on a cross section which is orthogonal to the exposure surface 28a of the first instant film 28 being transported and is in parallel with the transport direction. Accordingly, the spreading control member 56 can securely rub the positive image observation surface 40 of the first instant film 28.

Action of Position Alignment Unit of Film Pack Room

In a case where the first instant film pack 24 is loaded into the film pack room 23, the position alignment in the width direction X, the transport direction Y, and the loading direction Z is performed by the position alignment protrusions 61a to 61c and 62a, the elastic members 64a to 64c, and the pair of film holding portions 22a. That is, the first instant film 28 built in the first instant film pack 24 is aligned with respect to the transport roller pair incorporated in the camera body 11.

Figure 24:
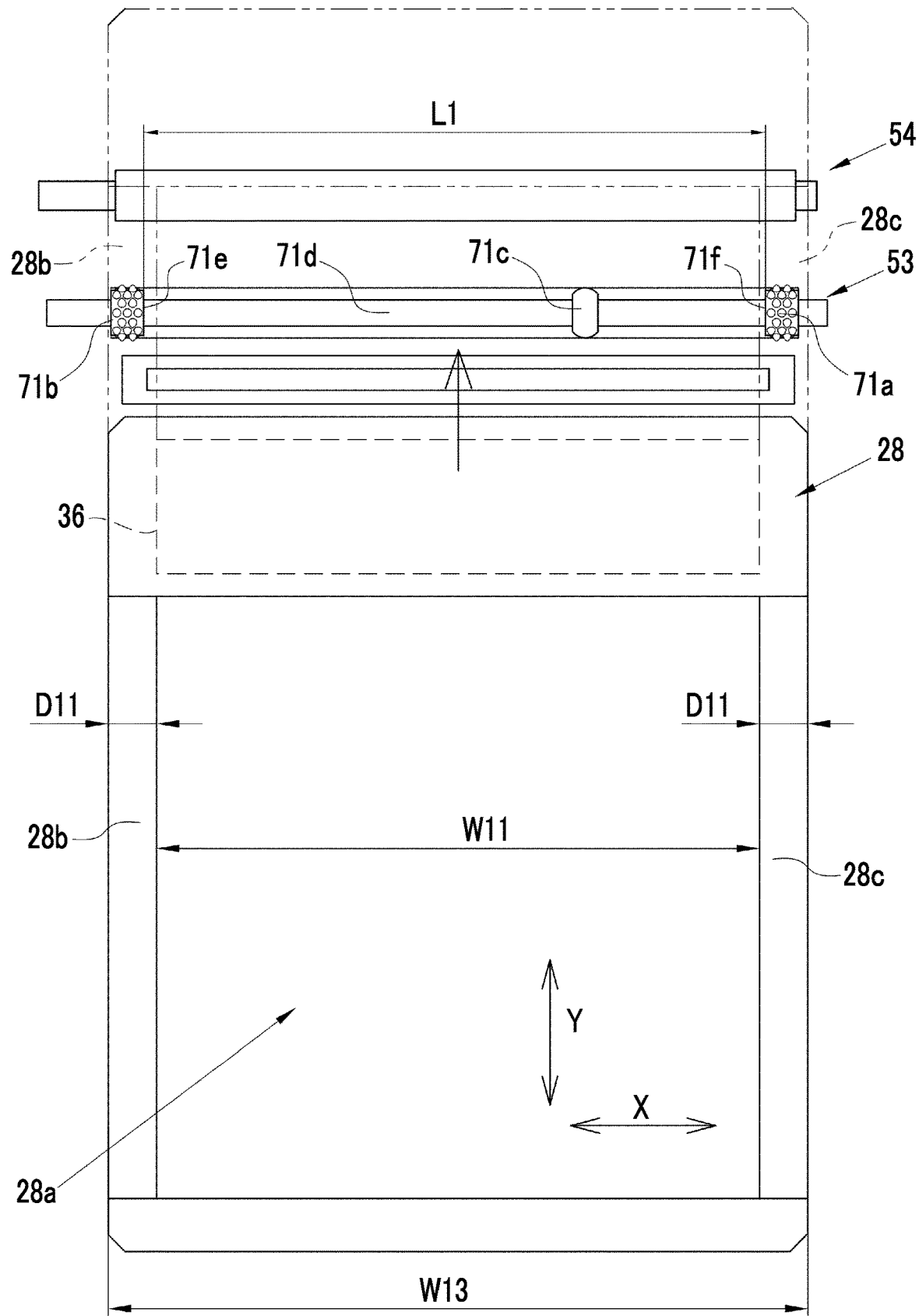
FIG. 24 is an explanatory diagram showing a positional relationship between a transport roller pair and the first instant film.

As shown in FIG. 24, the pair of spike roller members 71a and 71b are arranged at intervals from each other so as to correspond to the dimension of the first instant film 28 in the width direction X. More specifically, a first distance L1 which is an interval between inner edges 71e and 71f of the pair of spike roller members 71a and 71b is longer than the dimension W11 of the exposure surface 28a in the width direction X and is shorter than the dimension W13 of the first instant film 28 in the width direction X.

Figure 25:
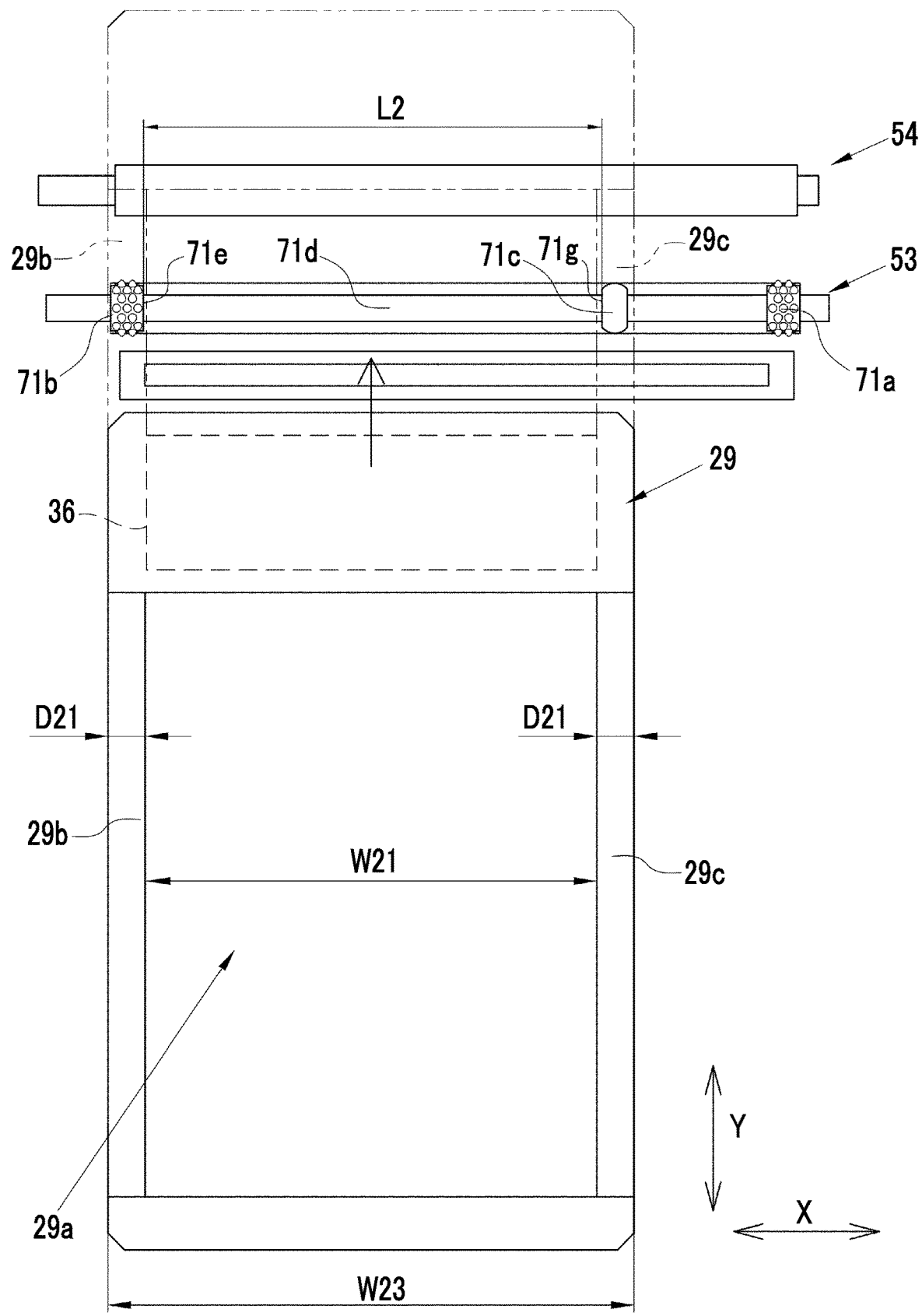
FIG. 25 is an explanatory diagram showing a positional relationship between the transport roller pair and the second instant film.

In a case where the transport roller pair 53 transports the first instant film 28, the first instant film 28 is aligned at a position at which both the side edge portions 28b and 28c of the first instant film 28 are in slidably contact with the pair of spike roller members 71a and 71b, respectively, especially by the position alignment of the position alignment protrusions 61a to 61c and 62a in the width direction X. Accordingly, the pair of spike roller members 71a and 71b can transport the first instant film 28 toward the spreading roller pair 54 by securely holding both the side edge portions 28b and 28c of the first instant film 28. The inner edges 71e and 71f of the spike roller members 71a and 71b refer to edges arranged on sides of the rotational shaft 71d facing each other in the axial direction in a case where the sub roller member 71c is excluded. FIGS. 24 and 25 are diagrams of the first and second instant films 28 and 29, the transport roller pair 53, the spreading roller pair 54, and the like as viewed from the exposure surfaces 28a and 29a.

In a case where the transport roller pair 53 transports the first instant film 28, the sub roller member 71c is present between the spike roller members 71a and 71b at a position at which the developer pod 36 of the first instant film 28 is pressed. However, as described above, since the sub roller member 71c is formed in a smooth curved surface shape that is convex outward, a pressing force is very small. Thus, the developer pod 36 is not crushed, and unevenness in the development does not occur only in the portion at which the sub roller member 71c touches the first instant film 28. Since the outer diameter R2 of the sub roller member 71c is formed to be smaller than the effective outer diameter R1 of the spike roller member 71a or 71b, it is possible to obtain a holding force in a case where the second instant film 29 is transported while further reducing the pressing force on the first instant film 28.

On the other hand, in a case where the second instant film pack 25 is loaded into the film pack room 23, the position alignment in the width direction X, the transport direction Y, and the loading direction Z is performed by the position alignment grooves 65a and 65b, the elastic members 64a and 64b, and the pair of film holding portions 22a. That is, the second instant film 29 built in the second instant film pack 25 is aligned with respect to the transport roller pair 53 incorporated in the camera body 11.

As shown in FIG. 25, the sub roller member 71c is disposed at an interval with respect to one spike roller member 71b so as to correspond to the dimension of the second instant film 29 in the width direction X. More specifically, a second distance L2 which is an interval between inner edges 71e and 71g of one spike roller member 71b and the sub roller member 71c is longer than the dimension W21 of the exposure surface 29a in the width direction X and is shorter than the dimension W23 of the second instant film 29 in the width direction X. Accordingly, since the spike roller member 71b securely holds one side edge portion 29b of the second instant film 29 and the other side edge portion 29b and the sub roller member 71c are in slidably contact with each other, the second instant film 29 can be transported toward the spreading roller pair 54.

Since the size of the second instant film 29 is smaller than the size of the first instant film 28, only one side edge portion is held and the other side edge portion is in slidably contact with the sub roller member, and thus, it is possible to obtain a sufficient torque. Accordingly, it is possible to transport the second instant film. The inner edges 71e and 71g of the spike roller member 71b and the sub roller member 71c refer to edges arranged on sides of the rotational shaft 71d facing each other in the axial direction.

As described above, the second instant film pack 25 is aligned with the film pack room 23 so as to be shifted to the right side surface 23a. Accordingly, as shown in FIG. 25, in a case where the transport roller pair 53 transports the second instant film 29, the second instant film 29 is aligned so as to correspond to the position at which one side edge portion 29b of the second instant films 29 is in slidably contact with one spike roller member 71b and so as to correspond to the position at which the other side edge portion 29c of the second instant film 29 is in slidably contact with the sub roller member 71c by the position alignment of the position alignment grooves 65a and 65b especially in the width direction X.

As described above, the dimensions D11 and D21 of both the side edge portions 28b and 28c of the first instant film 28 and both the side edge portions 29b and 29c of the second instant film 29 in the width direction X have dimensional differences. In the examples shown in FIGS. 9 and 13, a difference between D11 and D21 is 1 mm. That is, even though the second instant film pack 25 and the second instant film 29 are shifted to the right side surface 23a of the film pack room 23 as described above, the positions of one side edge portion 28b and one side edge portion 29b cannot be perfectly aligned. In a case where positions of lateral sides of the first and second instant films 28 and 29 are aligned, positions of lateral sides of the exposure surfaces 28a and 29a are not aligned.

Figure 26:
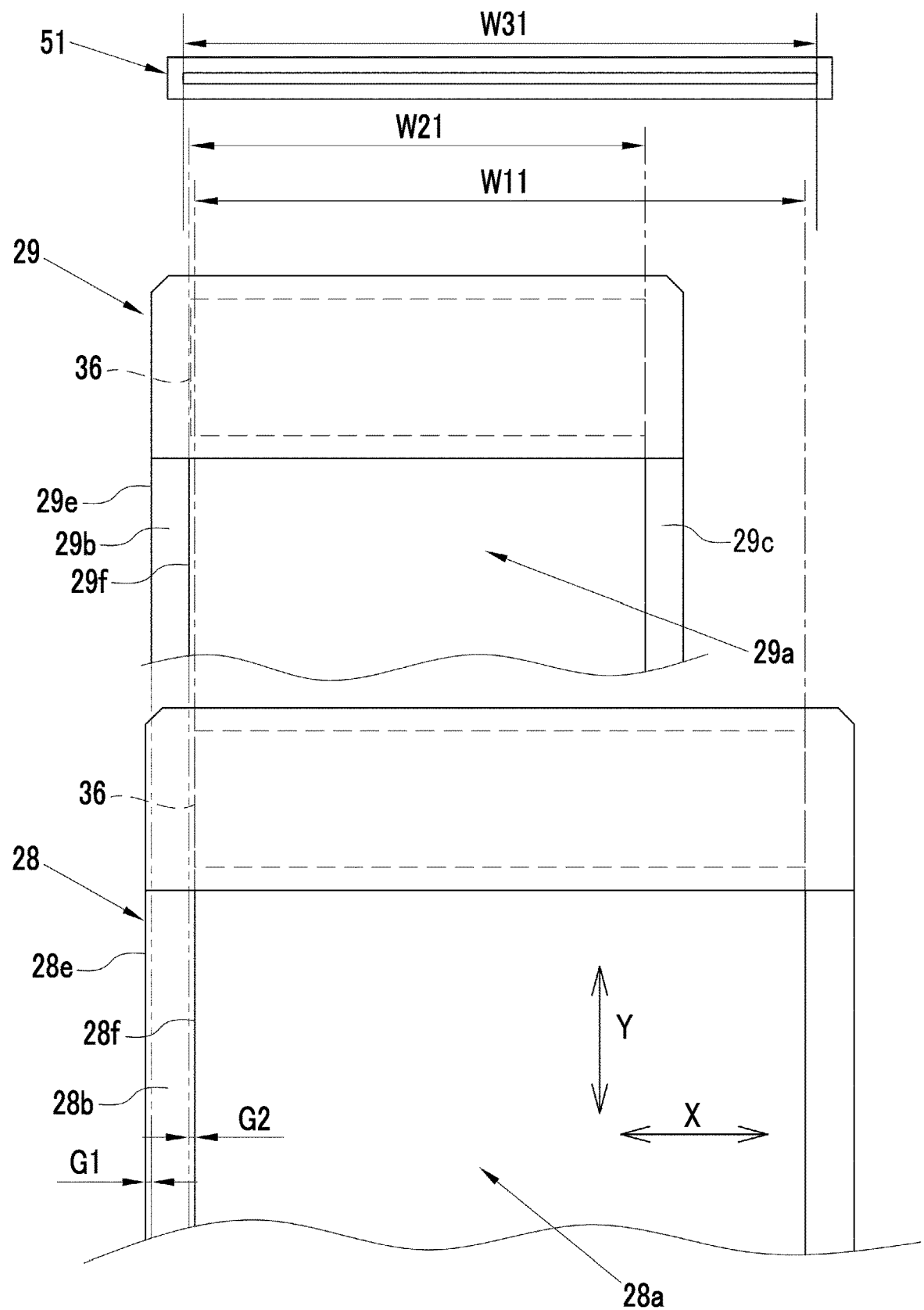
FIG. 26 is an explanatory diagram showing a positional relationship between the first instant film, the second instant film, and an exposure head.

Thus, in a case where the position alignment is performed as described above, as shown in FIG. 26, a position of one lateral side 29e of the second instant film 29 is slightly shifted inward with respect to a position of one lateral side 28e of the first instant film 28. As described above, since the right side surface 25a of the second instant film pack 25 is aligned with the right side surface 24a of the first instant film pack 24 so as to be shifted to the inside of the film pack room 23 by about 0.5 mm, the position can be shifted and the instant film can be transported as shown in FIG. 26. FIG. 26 shows position comparison in a case where the first and second instant films 28 and 29 are aligned by the position alignment protrusions 61a to 61c and 62a or the position alignment grooves 65a and 65b as described above and are transported by the transport roller pair 53. FIG. 26 is an explanatory diagram for comparison, and is different from an actual positional relationship between the first and second instant films 28 and 29, the exposure head 51, and the like.

In the example shown in FIG. 26, a difference G1 between the position of one lateral side 28e of the first instant film 28 and the position of one lateral side 29e of the second instant film 29 is 0.5 mm. However, a difference between the dimensions D11 and D21 of the side edge portions 29b and 29c in the width direction X is 1 mm as described above, and the position of the lateral side 29f of the exposure surface 29a is still positioned outside the position of the lateral side 28f of the exposure surface 28a by a difference G2, and the difference G2 is 0.5 mm. A shift between the positions of the exposure surfaces 28a and 29a will be described later.

As described above, the first and second instant film packs 24 and 25 are aligned by the position alignment protrusions 61a to 61c and 62a or the position alignment grooves 65a and 65b and the second instant film pack 25 is aligned with the film pack room 23 so as to be shifted to the right side surface 23a. Thus, in a case where any one of the first or second instant film packs 24 and 25 is loaded into film pack room 23, the cut-off portion 31b of the first instant film pack 24 and the cut-off portion 31b of the second instant film pack 25 are arranged at the same position (see FIG. 19 and FIG. 20). Accordingly, the common claw member 57 and the claw member drive mechanism 60 can press the first and second instant films 28 and 29. Further, it is possible to prevent an increase in the number of components without requiring the plurality of claw members or the complicated mechanism, and it is possible to reduce the cost. The same position includes a position within a range where the common claw member 57 can be inserted, and in a case where the position alignment is performed, any position where the claw member 57 can be inserted is acceptable even though the position of the cut-off portion 31b is slightly deviated.

The claw member 57 enters the inside of the first and second instant film packs 24 and 25 through the cut-off portion 23f and the cut-off portions 31b by the claw member drive mechanism 60, and presses the film cover 30 or the foremost first and second instant films 28 and 29. Accordingly, the film cover 30 or the foremost first and second instant films 28 and 29 can be discharged outwards from the first and second instant film packs 24 and 25 through the discharge ports 31c.

For example, the exposure head 51 is configured of a light source, a liquid crystal shutter, and a lens. The exposure head 51 is disposed on the upstream side of the transport roller pair 53 in the transport direction of the instant film and at a position facing the transport path of the instant film. The exposure head 51 irradiates the exposure surfaces 28a and 29a with line-shaped print light parallel to the width direction X of the first and second instant films 28 and 29.

The exposure is started based on output signals from a detection sensor (not shown) that detects the passing of the distal end portions of the first and second instant films 28 and 29 and a rotation speed detection sensor that detects a rotation speed of the capstan roller 71. Initially, the passing of the distal end portions is detected by a distal-end-portion passing detection sensor. The detection of the rotation speed is started by the rotation speed detection sensor based on the detection signal. In a case where the rotation speed reaches a predetermined value, the detection sensor detects that the exposure surface 28a of the first instant film 28 is transported to a position facing the exposure head 51. Accordingly, the exposure by the exposure head 51 is started.

The exposure by the exposure head 51 is switched according to the signal of the detection switch 78 (detector) provided in the film pack room 23. As shown in (A) of FIG. 27, the detection switch 78 is configured of a press portion 78a, a spring, a contact (both not shown), a case 78b holding these components, and the like. The detection switch 78 is provided on the left side surface 23b of the film pack room 23. The case 78b is fitted into an opening portion 23g formed in the left side surface 23b of the film pack room 23, and does not protrude to the inside of the film pack room 23.

As described above, since the second instant film pack 25 is aligned with the film pack room 23 so as to be shifted to the right side surface 23a, the second instant film pack does not touch the detection switch 78. Since the first instant film pack 24 touches the position alignment protrusion 62a provided on the left side surface 23b, the first instant film similarly touches the detection switch 78 provided on the left side surface 23b.

The press portion 78a has a fan shape. The press portion 78a is rotatably supported with respect to the case 78b via a rotational shaft 78c. The press portion 78a protrudes from the case 78b and enters the inside of the film pack room 23 by a spring incorporated in the case 78b.

Figure 27:
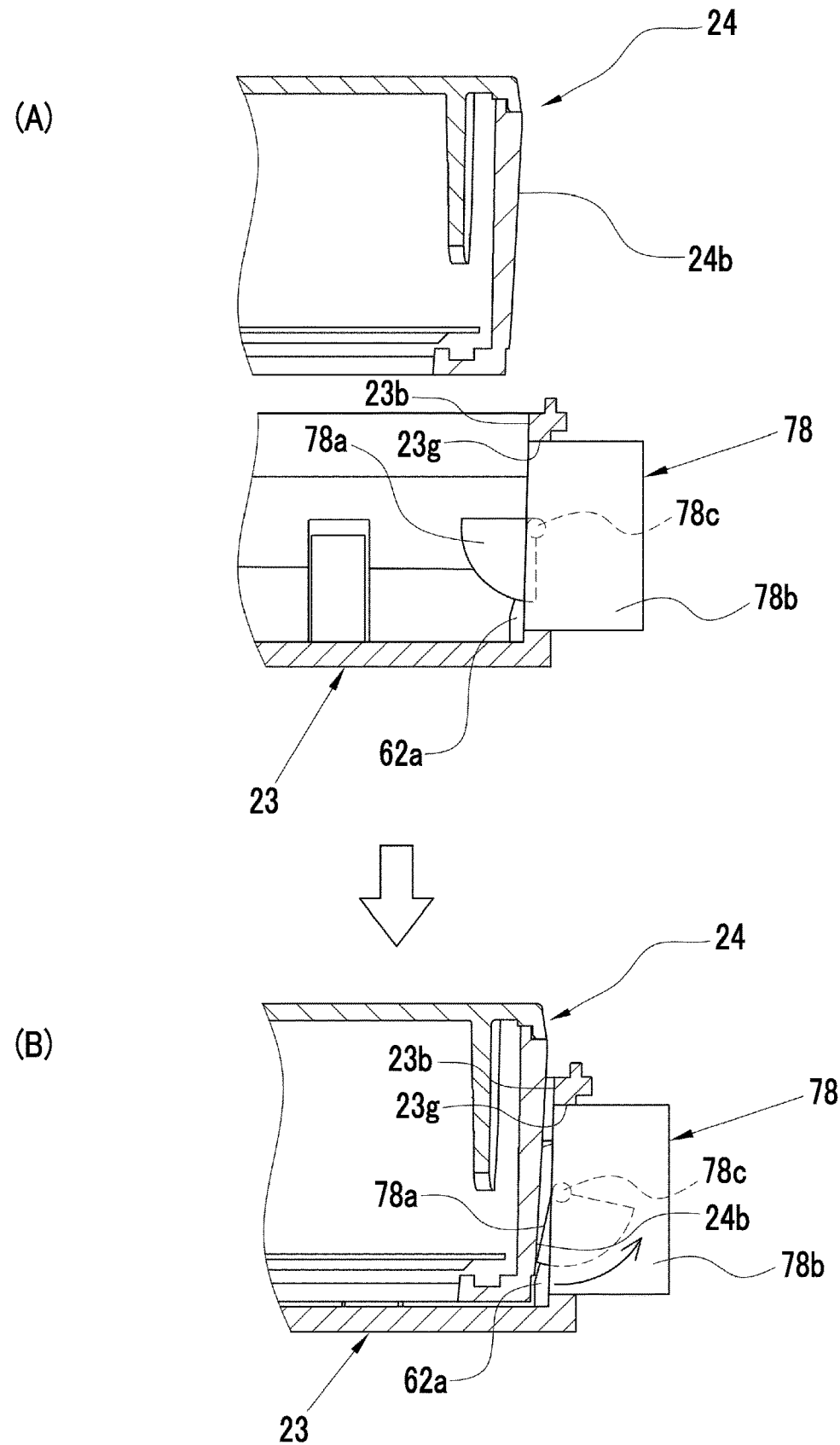
FIG. 27 is an explanatory diagram showing an operation of a detection switch.

As shown in (B) of FIG. 27, in a case where the first instant film pack 24 is loaded into the film pack room 23, a side surface 24b of the first instant film pack 24 presses the press portion 78a. The press portion 78a is pushed into the case 78b against the urging force of the spring, and presses an internal contact and the like. Accordingly, the detection switch 78 outputs an on signal. In a case where the press portion 78a is not pressed, the detection switch 78 outputs an off signal.

As described above, the dimension W21 of the exposure surface 29a of the second instant film 29 in the width direction X is smaller than the dimension W11 of the exposure surface 28a of the first instant film 28 in the width direction X. On the other hand, the position of the lateral side 29f of the exposure surface 29a is positioned outside the position of the lateral side 28f of the exposure surface 28a by the difference G2 by the position alignment of the position alignment protrusions 61a to 61c and 62a or the position alignment grooves 65a and 65b (see FIG. 26). Even though the exposure surface 28a having a larger dimension in the width direction X is irradiated with the line-shaped print light to be applied to the exposure surfaces 28a and 29a, since one lateral side 29f of the exposure surface 29a is positioned outside the lateral side 28f of the exposure surface 28a, the exposure can be performed by the difference G2. Thus, in the exposure head 51 of the present embodiment, a maximum irradiation range W31 of the line-shaped print light is set to be larger than the dimension W11 of the exposure surface 28a in the width direction X. In a case where the first and second instant films 28 and 29 illustrated above are used, it is preferable that the maximum irradiation range W31 of the line-shaped print light is set to be about 1 mm larger than the dimension W11 of the exposure surface 28a in the width direction X.

The controller 59 controls to switch between exposure ranges in which the exposure head 51 exposes an image according to the signal from the detection switch 78. That is, the controller 59 switches between control such that the exposure head 51 exposes in an exposure range corresponding to the first instant film 28 in a case where the on signal is output from the detection switch 78 and control such that the exposure head exposes in an exposure range corresponding to the second instant film 29 in a case where the off signal is output from the detection switch 78.

Figure 28:
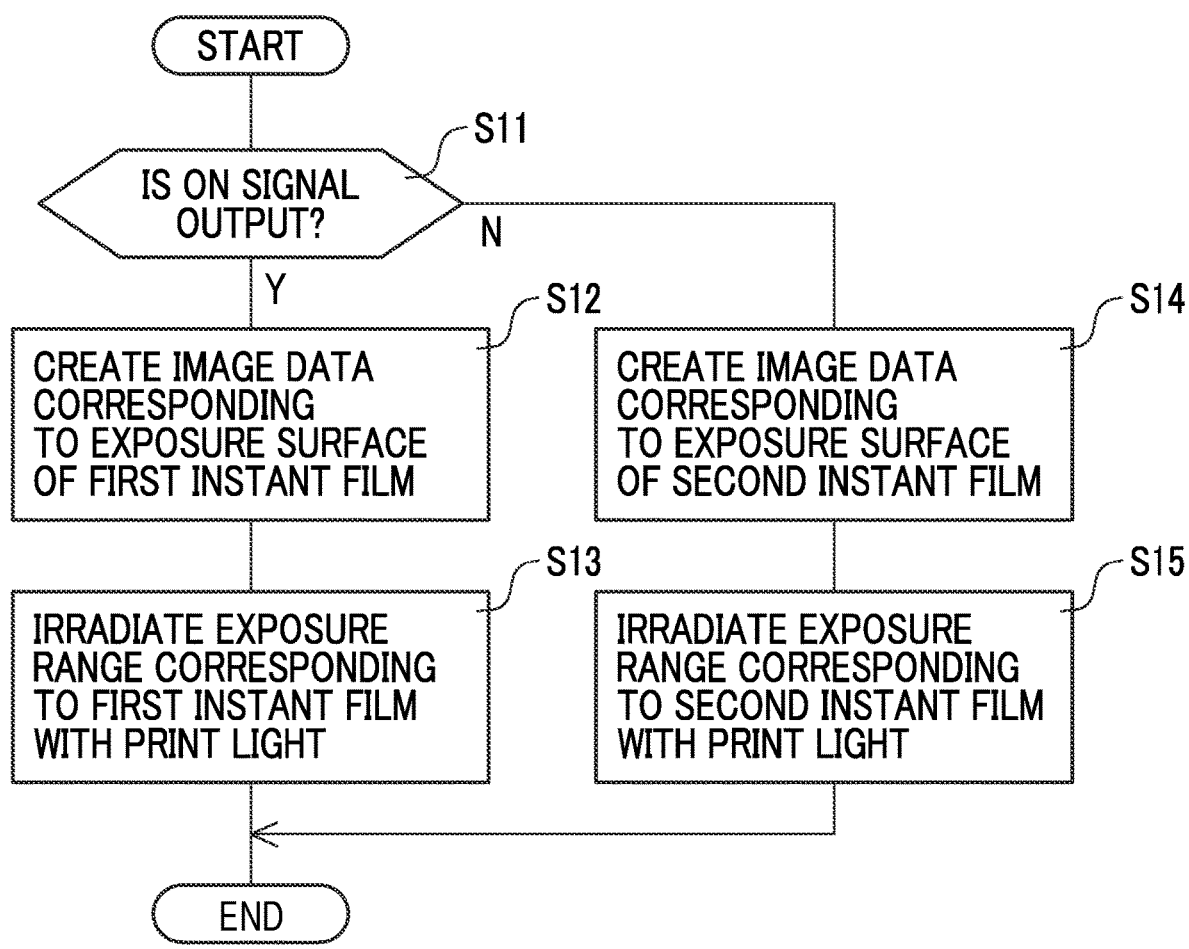
FIG. 28 is a flowchart illustrating switching control of the exposure head by a controller.

The switching control of the exposure head 51 by the controller 59 will be described with reference to a flowchart shown in FIG. 28 and explanatory diagrams shown in FIGS. 26 and 29. The printing process by the printer unit 13 is started by the photographer pressing the print switch 18b. First, the controller 59 determines whether the signal output from the detection switch 78 is the on signal or the off signal (S11).

In a case where the first instant film pack 24 is loaded into the film pack room 23, that is, in a case where the on signal is output from the detection switch 78 (Yin S11), the controller 59 creates image data D1 corresponding to the exposure surface 28a of the large first instant film 28 of which the dimension in the width direction X is large (S12). After the image data D1 is created, the controller 59 controls the exposure head 51 based on the image data D1 recorded in the built-in memory, and irradiates the exposure range corresponding to the first instant film 28, that is, so as to correspond to the dimension W11 of the exposure surface 28a in the width direction X with the line-shaped print light (S13; see FIG. 26). The transport roller pair 53 transports the first instant film 28 discharged from the first instant film pack 24 by the claw member 57 toward the spreading roller pair 54. Accordingly, an image can be formed over the entire surface of the exposure surface 28a. The first instant film 28 on which the image is formed is ejected from the film ejection port 21 to the outside of the camera body 11 by the spreading roller pair 54.

On the other hand, in a case where the second instant film pack 25 is loaded into the film pack room 23, that is, in a case where the off signal is output from the detection switch 78 (N in S11), the controller 59 creates image data D2 corresponding to the exposure surface 29a of the second instant film 29 of which the dimension in the width direction X is small (S14). In the example shown in FIG. 29, since the dimension of the exposure surface 29a in the width direction X is smaller than the dimension of the exposure surface 28a in the width direction X, the image data D2 is created by trimming (cutting out) an image in a center portion in the width direction X from the image data D1.

After the image data D2 is created, the controller 59 controls the exposure head 51 based on the image data D2, and irradiates the exposure range corresponding to the second instant film 29, that is, so as to correspond to the dimension W21 of the exposure surface 29a in the width direction X with the line-shaped print light (S15; see FIG. 26). The transport roller pair 53 transports the second instant film 29 discharged from the second instant film pack 25 by the claw member 57 toward the spreading roller pair 54. In a case where the exposure head 51 irradiates the exposure surface 29a with the print light, the position of the lateral side 29f of the exposure surface 29a is positioned outside the position of the lateral side 28f of the exposure surface 28a by the difference G2. However, since the maximum irradiation range W31 of the exposure head 51 with the print light is set to be large, an image can be formed over the entire surface of the exposure surface 29a. The second instant film 29 on which the image is formed is ejected from the film ejection port 21 to the outside of the camera body 11 by the spreading roller pair 54.

Figure 29:
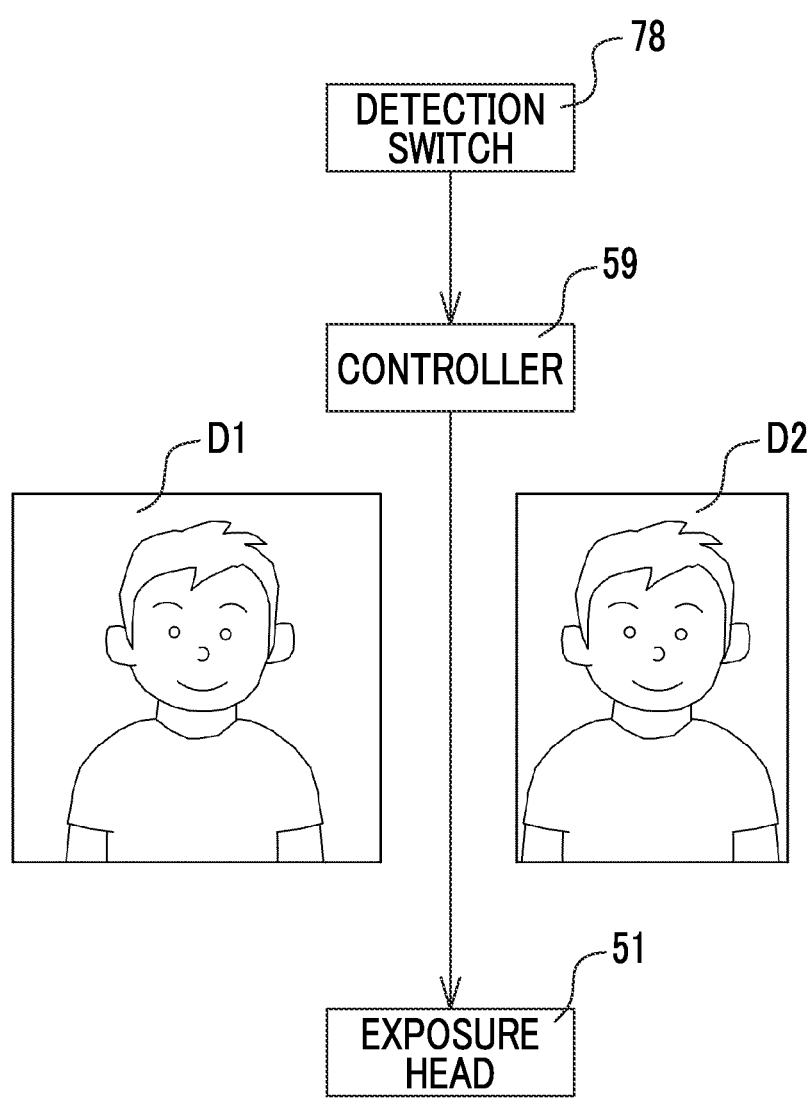
FIG. 29 is an explanatory diagram showing an operation of the controller and the exposure head.

In the example shown in FIG. 29, the image data D2 is created by trimming the image in the center portion in the width direction X from the image data D1, but the present invention is not limited thereto. The image data D2 corresponding to the exposure surface 29a of the second instant film 29 may be created. For example, the image data D2 may be created by reducing the image data D1 corresponding to the exposure surface 28a of the first instant film 28 by the same ratio in the width direction X and the transport direction Y.

In the above embodiment, the detection switch 78 that detects the pressure from the first instant film pack 24 is used as the detector that detects that the first instant film pack 24 is loaded into the film pack room 23. However, the present invention is not limited thereto, and a contact-type detector that outputs an on signal by coming contact with the first instant film pack 24, a detector including a photoelectric sensor, or the like may be used.

In the above embodiment, an example in which a transport device for an instant film is applied to the digital camera with a printer is used, but the present invention is not limited thereto, and may be applied to a printer. For example, in the printer unit 13 similar to the above embodiment and a device main body having the printer unit, a printer in which any one of the first and second instant film packs 24 and 25 is loaded into the film pack room 23, image data is received by using wireless communication from an electronic device such as a smartphone, and image is printed on the first and second instant films 28 and 29 based on the received image data is preferable.

In the above embodiment, a hardware structure of a processing unit that executes various kinds of processing such as the controller 59 includes various processors to be described below. The various processors include a central processing unit (CPU) which is a general-purpose processor that functions as various processing units by executing software (program), a graphical processing unit (GPU), a programmable logic device (PLD) such as a field programmable gate array (FPGA) which is a processor capable of changing a circuit configuration after manufacture, a dedicated electric circuit which is a processor having a circuit configuration specifically designed to execute various processing, and the like.

One processing unit may be configured by one of these various processors, or may be configured by a combination of two or more processors having the same type or different types (for example, a combination of a plurality of FPGAs, a combination of a CPU and an FPGA, a combination of a CPU and a GPU, or the like). The plurality of processing units may be constituted by one processor. As an example in which the plurality of processing units are constituted by one processor, firstly, one processor is constituted by a combination of one or more CPUs and software as represented by computers such as clients and servers, and this processor functions as the plurality of processing units. Secondly, a processor that realizes the functions of the entire system including the plurality of processing units via one integrated circuit (IC) chip is used as represented by a system on chip (SoC). As described above, the various processing units are constituted by using one or more of the various processors as the hardware structure.

More specifically, an electric circuitry in which circuit elements such as semiconductor elements are combined can be used as the hardware structure of these various processors.

EXPLANATION OF REFERENCES

10: digital camera with printer
11: camera body
12: imaging unit
13: printer unit
15: imaging window
16A: release switch
16B: release switch
17: rear display unit
18: operation unit
18a: menu switch
18b: print switch
19: imaging optical system
20: solid-state imaging element
21: film ejection port
22: loading cover
22a: film holding portion
22c: hinge portion
23: film pack room
23a: right side surface
23b: left side surface
23c: bottom surface
23d: top surface
23e: front surface
23f: cut-off portion
23g: opening portion
24, 25: instant film pack
24a, 24b: side surface
24c: L-shaped protrusion
24d: bottom surface
24e: top surface
25a, 25b: side surface
25c: bottom surface
25d: protrusion
25e: front surface
25f, 25g: rib
25h: top surface
26: case
27: film press plate
27a, 27b: sheet
27c, 27e: opening
27d, 27f: hole
27g, 27h: lower end portion
28, 29: instant film
28a, 29a: exposure surface
28b, 28c, 29b, 29c: side edge portion
28e, 28f, 29e, 29f: lateral side
30: film cover
31: case member
31a: exposure opening
31b: cut-off portion
31c: discharge port
31d: light shielding seal
32: cover
32a: opening
32b: unit support protrusion
32c: pair of caulking pins
32d: support piece
33: mask sheet
33a: screen opening
34: photosensitive sheet
35: cover sheet
36: developer pod
37: trap portion
38: developer
39: gap
40: positive image observation surface
51: exposure head
52: roller drive mechanism
53: transport roller pair
54: spreading roller pair
56: spreading control member
56a: support member
57: claw member
58: ejection guide
59: controller
60: claw member drive mechanism
61a, 61b, 61c, 62a: position alignment protrusion
63a: L-shaped cut-off portion
64a, 64b, 64c: elastic member
65a, 65b: position alignment groove
66: cut-off portion for reversal loading prevention
67: press member
67a: distal end portion
67b: rotational shaft
68: holding frame
69: spring
71: capstan roller
71a: spike roller member
71b: spike roller member
71c: sub roller member
71d: rotational shaft
71e: inner edge
71f: inner edge
71g: inner edge
72: pinch roller
72a: roller member
72b: rotational shaft
73: spreading roller 74: spreading roller
76: spring
77: spring
78: detection switch
78a: press portion
78b: case
78c: rotational shaft
CLX0, CLX1, CLX2: center line
D11, D21: dimension
G1, G2: difference
H11, H21: dimension
L1: first distance
L2: second distance
P: exposure position
R1: effective outer diameter
R2: outer diameter
RM: maximum outer diameter
RO: minimum outer diameter
S: space
SL1, SL2, TP11, TP20, TP21, W11, W12, W13, W21, W22, W23, WP1, WP2: dimension
W31: maximum irradiation range

What is claimed is:

1. A printer comprising:
a loading room into which any one of a first instant film pack or a second instant film pack is loaded, the first instant film pack including at least a plurality of first instant films and a first case which accommodates the first instant films in a stacking manner and in which a discharge port for discharging the first instant film is formed, the second instant film pack including at least a plurality of second instant films and a second case which accommodates the second instant films in a stacking manner and in which a discharge port for discharging the second instant film is formed;
an exposure head that exposes an image on the first instant film or the second instant film;
a transport mechanism that transports the first instant film or the second instant film to an exposure position at which the exposure head exposes the image;
a discharge mechanism that has a claw member that is positioned on one side in a width direction of the loading room and that enters inside the first case or the second case, and in which the claw member presses and discharges the first or second instant film through the discharge port; and
a position alignment unit that aligns the first and second instant film packs in the loading room;
wherein the first and second cases have insertion ports into which the claw member is inserted,
the second instant film pack has a dimension smaller than a dimension of the first instant film pack in the width direction,
the position alignment unit aligns the second instant film pack so as to be shifted to the one side in the width direction on which the claw member is positioned, and
the first and second instant film packs aligned by the position alignment unit have the insertion ports arranged at the same position in the loading room.

2. The printer according to claim 1,
wherein the second instant film pack has a stepped portion having a dimension larger than a dimension of the first instant film pack in a thickness direction parallel to a loading direction into the loading room and orthogonal to the width direction, and
the position alignment unit includes:
a first position alignment unit that aligns the first instant film pack by touching both side surfaces of the first instant film pack; and
a second position alignment unit that aligns the second instant film pack so as to be shifted to the one side in the width direction on which the claw member is positioned in the loading room by being fitted to the stepped portion.

3. The printer according to claim 2,
wherein the stepped portion is a rib that extends in parallel with a length direction orthogonal to the width direction and the thickness direction, and protrudes in the thickness direction, and
the second position alignment unit is a position alignment groove that is fitted to the rib.

4. The printer according to claim 2,
wherein the first position alignment unit is a wedge-shaped position alignment protrusion provided on a side surface of the loading room.

5. The printer according to claim 2,
wherein the second position alignment unit is positioned inside the loading room in the width direction with respect to the first position alignment unit.

6. A digital camera with a printer comprising:
the printer according to claim 1; and
an imaging unit that includes an imaging optical system, and captures a subject image to output image data to the printer.

* * * * *